United States Patent
Taylor et al.

(10) Patent No.: US 11,390,364 B2
(45) Date of Patent: Jul. 19, 2022

(54) SYSTEMS, APPARATUS, AND METHODS FOR TRANSPORTING VESSELS

(71) Applicant: Bardex Corporation, Goleta, CA (US)

(72) Inventors: Robert Taylor, Santa Barbara, CA (US); Charlie O'Rourke, Ventura, CA (US); James Gilpin, Goleta, CA (US); Nick Atallah, Goleta, CA (US)

(73) Assignee: Bardex Corporation, Goleta, CA (US)

( * ) Notice: Subject to any disclaimer, the term of this patent is extended or adjusted under 35 U.S.C. 154(b) by 612 days.

(21) Appl. No.: 16/201,978

(22) Filed: Nov. 27, 2018

(65) Prior Publication Data

US 2019/0263488 A1  Aug. 29, 2019

Related U.S. Application Data

(60) Provisional application No. 62/591,013, filed on Nov. 27, 2017.

(51) Int. Cl.
*B63C 3/08* (2006.01)
*B63C 3/04* (2006.01)
(Continued)

(52) U.S. Cl.
CPC ...... *B63C 3/08* (2013.01); *B60S 9/00* (2013.01); *B61F 3/02* (2013.01); *B61F 5/00* (2013.01);
(Continued)

(58) Field of Classification Search
CPC ..... B63C 3/08; B63C 3/04; B63C 3/12; B60S 9/00; B61F 3/02; B61F 5/00; B62D 21/00;
(Continued)

(56) References Cited

U.S. PATENT DOCUMENTS

| 2,120,792 A | 6/1938 | Yanney |
| 2,395,066 A | 2/1946 | Reynolds et al. |

(Continued)

FOREIGN PATENT DOCUMENTS

| EP | 1512654 A1 | 3/2005 |
| GB | 1229261 A | 4/1971 |

OTHER PUBLICATIONS

International Preliminary Report on Patentability Issued in PCT Application No. PCT/US2018/062661, dated Jun. 11, 2020; 12 pages.

(Continued)

*Primary Examiner* — Carib A Oquendo
(74) *Attorney, Agent, or Firm* — Michael S McCoy; Amatong McCoy LLC

(57) ABSTRACT

Vessel transfer systems are provide herein. The systems include bogies, including a pivoting bogie and a rack and pinion bogie, as well as associated cradles, carriages, and power and control units. The pivoting bogie includes a first side frame, a second side frame, at least one wheel coupled with each of the first and second side frames, and a lift member coupled with each of the first and second side frames. The lift member is pivotably coupled to the first side frame. The rack and pinion bogie includes a frame and pinion gears coupled with the frame. The pinion gears can be selectively coupled with a gear rack, such as at a shipyard. Also provided herein are methods of use of one or both of the bogies and associated equipment, such as for moving vessels within a shipyard.

21 Claims, 14 Drawing Sheets

(51) Int. Cl.
    *B63C 3/12*     (2006.01)
    *B66F 7/00*     (2006.01)
    *B62D 21/00*     (2006.01)
    *B61F 5/00*     (2006.01)
    *B60S 9/00*     (2006.01)
    *B66F 19/00*     (2006.01)
    *B66F 11/00*     (2006.01)
    *B61F 3/02*     (2006.01)

(52) U.S. Cl.
    CPC ............... *B62D 21/00* (2013.01); *B63C 3/04* (2013.01); *B63C 3/12* (2013.01); *B66F 7/00* (2013.01); *B66F 11/00* (2013.01); *B66F 19/00* (2013.01)

(58) Field of Classification Search
    CPC .. B66F 11/00; B66F 7/00; B66F 19/00; B60P 1/34
    See application file for complete search history.

(56) References Cited

U.S. PATENT DOCUMENTS

| | | |
|---|---|---|
| 3,593,859 A | 7/1971 | Spannlang et al. |
| 3,612,312 A * | 10/1971 | Behrmann ........... B62D 13/005 414/812 |
| 3,640,503 A | 2/1972 | Spannlang |
| 3,902,616 A | 9/1975 | Santic et al. |
| 3,918,366 A | 11/1975 | Noah |
| 3,937,153 A * | 2/1976 | Durocher ............... B61F 5/08 105/193 |
| 4,175,644 A | 11/1979 | Sikli |
| 4,416,217 A * | 11/1983 | Nakamura ........... C23C 14/027 118/696 |
| 5,076,450 A | 12/1991 | Shimizu |
| 6,070,898 A * | 6/2000 | Dickie ................. A61G 5/043 180/65.1 |
| 6,279,488 B1 | 8/2001 | Hachmann et al. |
| 9,226,440 B2 | 1/2016 | Bassett |
| 10,308,327 B1 * | 6/2019 | Van Loon ............. B63B 25/28 |
| 10,577,061 B2 | 3/2020 | Taylor |
| 2011/0101295 A1 | 5/2011 | Hernandez |
| 2015/0028787 A1 | 1/2015 | Sekine et al. |

OTHER PUBLICATIONS

International Search Report dated Mar. 22, 2019, during the prosecution of International Application No. PCT/US2018/062661. [6 pages].
Written Opinion dated Mar. 22, 2019, during the prosecution of International Application No. PCT/US2018/062661. [10 pages].
Supplementary Partial EP Search Report, issued in EP Application No. 18881321.6 dated Jul. 29, 2021 [14 Pages].

* cited by examiner

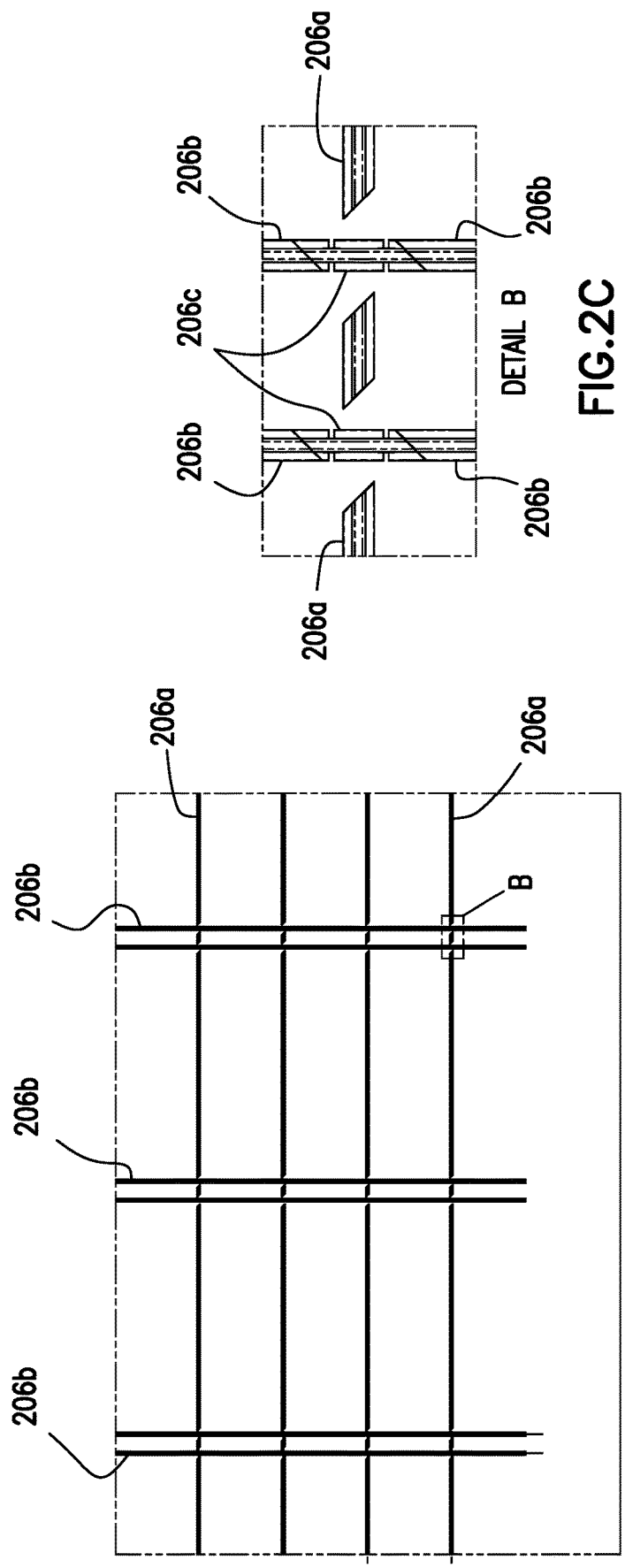

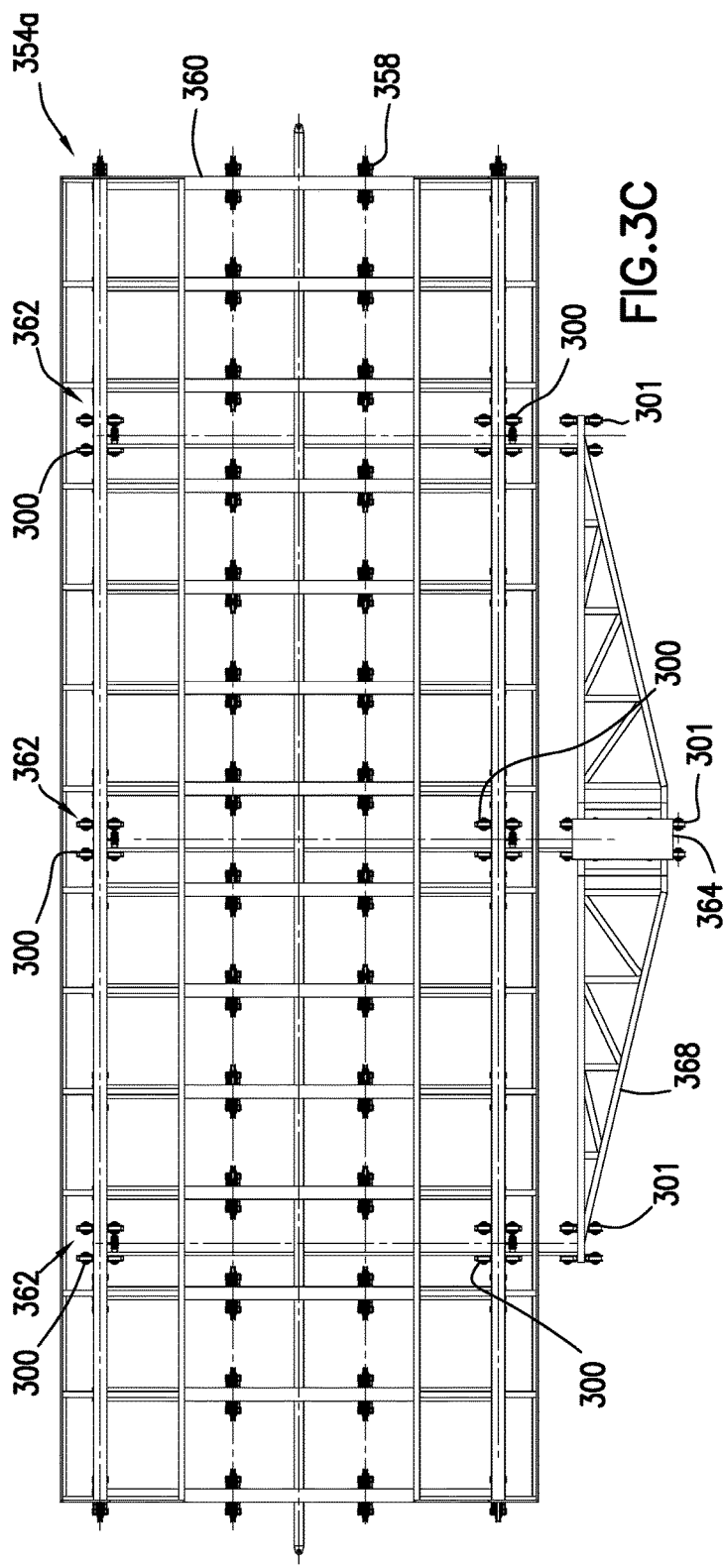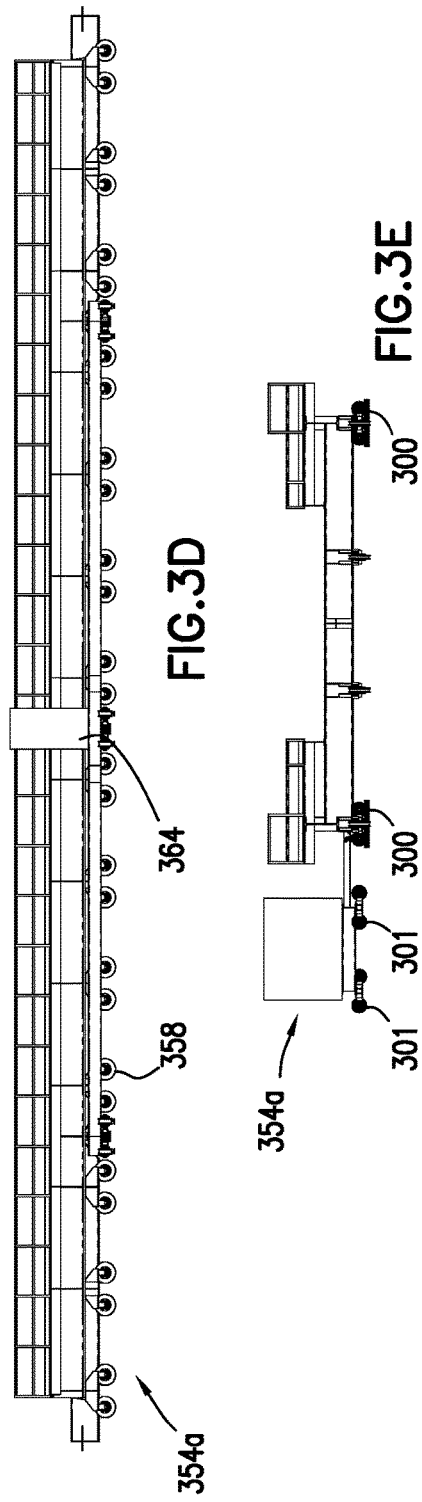

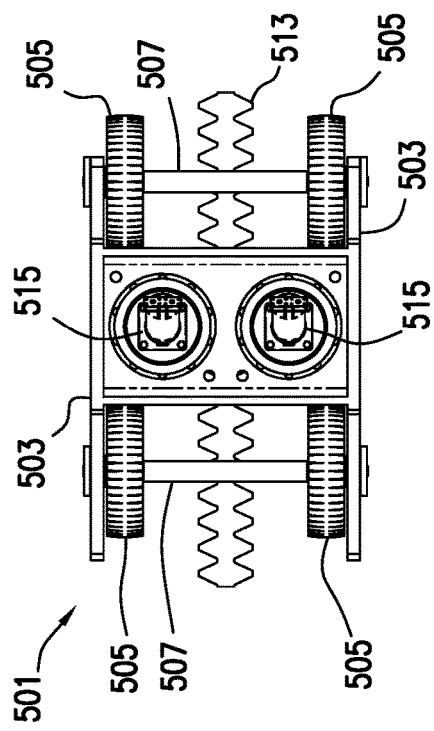
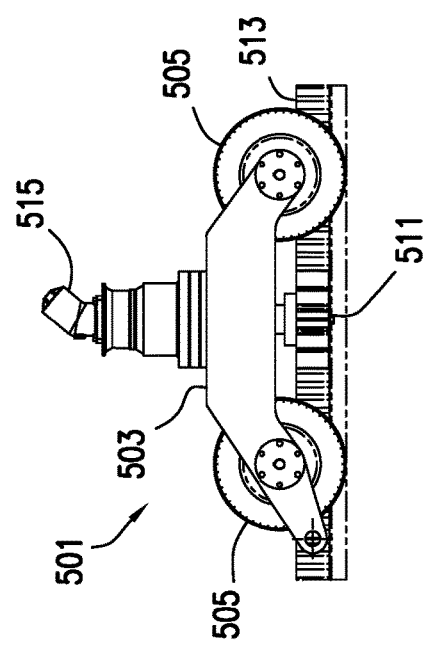
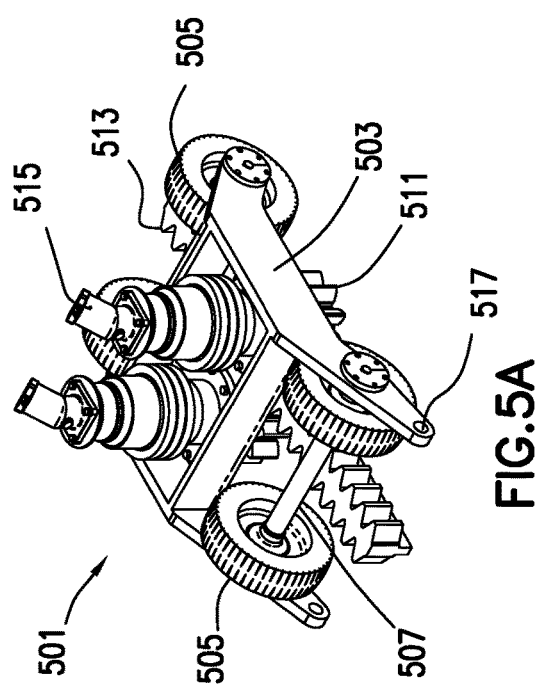
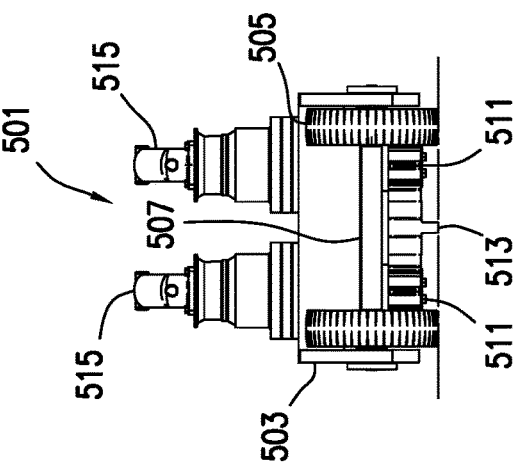
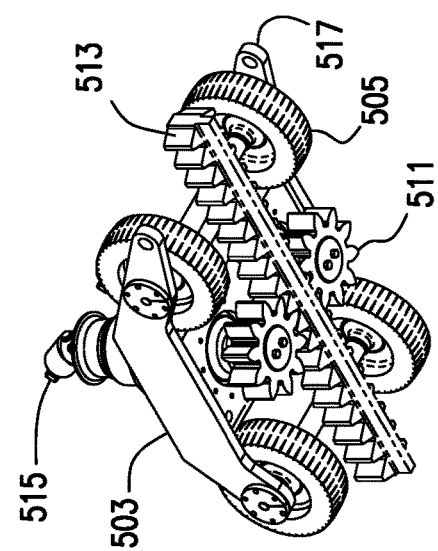

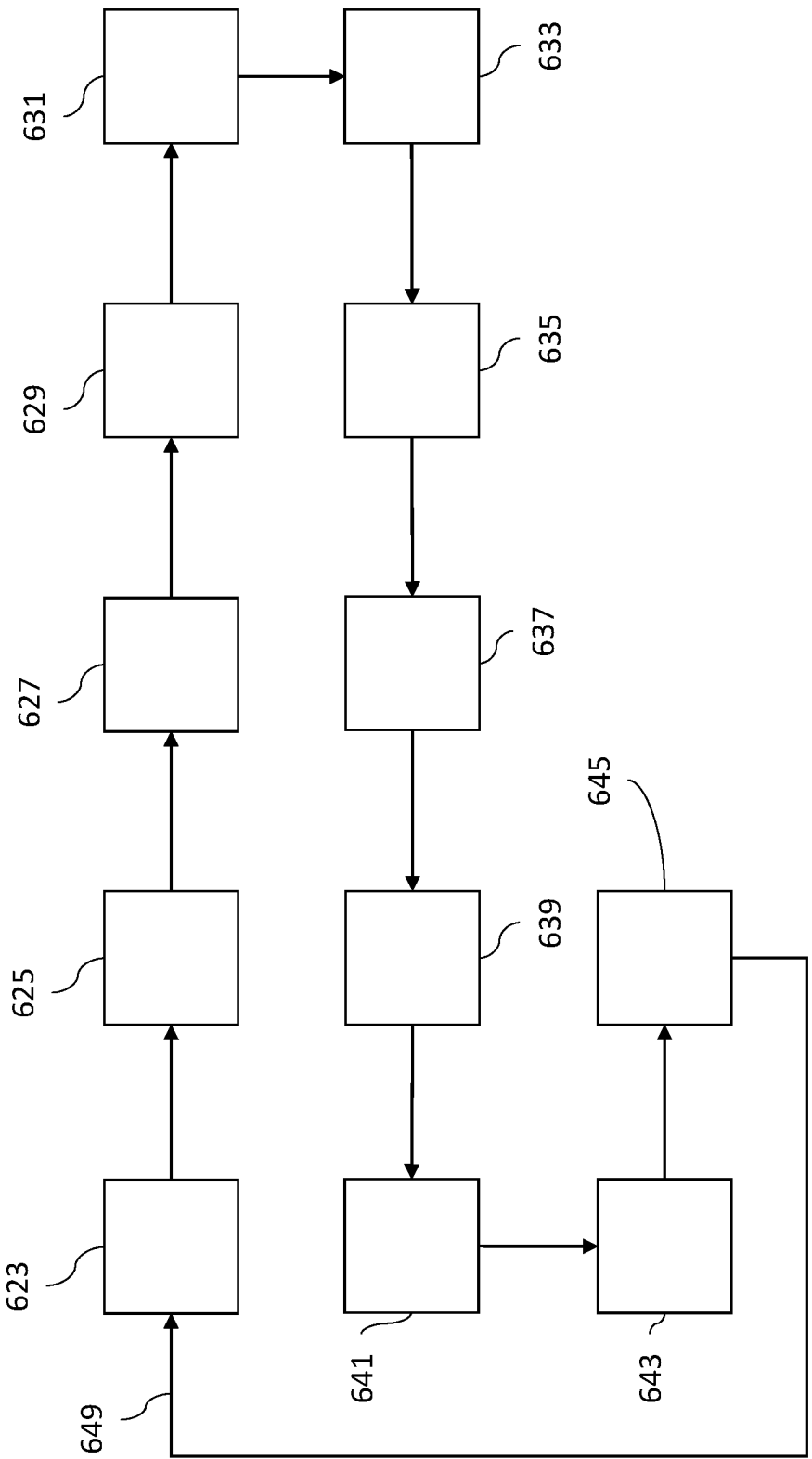

SYSTEMS, APPARATUS, AND METHODS FOR TRANSPORTING VESSELS

CROSS-REFERENCE TO RELATED APPLICATIONS

The present application claims the benefit of U.S. Provisional Patent Application No. 62/591,013, filed on Nov. 27, 2017, entitled "Bogie Transfer Systems", the entirety of which is incorporated herein by reference.

FIELD

The present disclosure relates to systems, apparatus, and methods of transferring vessels, such as to move ships within a shipyard.

BACKGROUND

Vessel transfer systems, such as bogies, are used to transfer ships within a shipyard, such as to move a ship between a shiplift, repair bay, drydock, launch, and other such locations at a shipyard. Bogies can be used to lift up cradles that support vessels and transfer the cradled vessels on rails at the shipyard, allowing the vessels to be moved to various locations at the shipyard.

Bogies are typically four-wheeled, rigid structures that bear the load of cradled vessels as the bogie transfers the cradled vessel on the rails within the shipyard. In operation of existing bogies, any two wheels of the four-wheeled bogie might, at times, bear the entire load of the cradled vessel depending on, for example, the flatness and precision of the rails. When multiple bogies or sets of bogies are used, steel springs, or sometimes cranes with pinned connections, are used to spread the load amongst the bogies.

Further, cradled vessels are typically moved on the rails in the shipyard by pulling the cradled vessels using, for example, bulldozers, large winches, or hydraulic drive systems on the bogies supporting the cradled vessels.

BRIEF SUMMARY

One aspect of the present disclosure includes a vessel transfer system. The system includes a bogie. The bogie includes a first side frame, a second side frame, at least one wheel coupled with each of the first and second side frames, and a lift member coupled with each of the first and second side frames. The lift member is pivotably coupled to the first side frame.

Another embodiment of the present disclosure includes a vessel transfer system. The system includes a bogie. The bogie includes a frame and pinion gears coupled with the frame. The pinion gears are positioned to selectively couple with a gear rack.

Another embodiment of the present disclosure includes a method of moving a cradled vessel within a shipyard. The cradled vessel includes a vessel supported on a cradle. The method includes positioning at least two bogie trains relative to the cradled vessel. Each bogie train includes at least two bogies. Each bogie includes a first side frame, a second side frame, at least one wheel coupled with each of the first and second side frames, and a lift member coupled with the second side frame and pivotably coupled with the first side frame. The method includes actuating the lift members to engage the cradle and lift the cradled vessel above a surface of the shipyard. The method includes actuating the wheels to move the bogie trains within the shipyard; thereby, moving the cradled vessel within the shipyard. The method includes actuating the lift members to lower the cradled vessel into engagement with the shipyard and to disengage the lift members from the cradle.

Another embodiment of the present disclosure includes a method of moving cradled vessels within a shipyard. The method includes coupling a bogie with a transfer cradle, with a vessel positioned on the transfer cradle. The bogie includes a frame and pinion gears coupled with the frame. The pinion gears are coupled with a gear rack on a surface of a shipyard. The method includes actuating the pinion gears to move along the gear rack; thereby, moving the bogie, the transfer carriage and the vessel within the shipyard.

BRIEF DESCRIPTION OF THE DRAWINGS

So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 2B is a detail view of section A of the shipyard of FIG. 2A;
FIG. 2C is a detail view of section B of the shipyard of FIG. 2B;
FIG. 3C is a plan view of a bogie module;
FIG. 3D is a side view of the bogie module of FIG. 3C;
FIG. 3E is another side view of the bogie module of FIG. 3C;
FIG. 5A is a top perspective view of a rack and pinion bogie;
FIG. 5B is a bottom perspective view of the rack and pinion bogie of FIG. 5A;
FIG. 5C is a front side view of the rack and pinion bogie of FIG. 5A;
FIG. 5D is a plan view of the rack and pinion bogie of FIG. 5A;
FIG. 5E is a right-side view of the rack and pinion bogie of FIG. 5A.

FIG. 6 is a flow chart of a transfer sequence for moving a vessel in a shipyard.

Systems, apparatus, and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain aspects of the present disclosure include vessel transfer systems, in particular bogie transfer systems, as well as to methods of making and using the same.

Bogie with Pivot Axle

One aspect of the present disclosure includes a bogie transfer system that includes a bogie with a pivoting wheel truck, and to methods of making and using the same. Some embodiments of the bogie are simple, reliable, rugged and compact wheeled modules that are engineered for long-term use in a marine environment, such as at a shipyard.

Figure 1A:
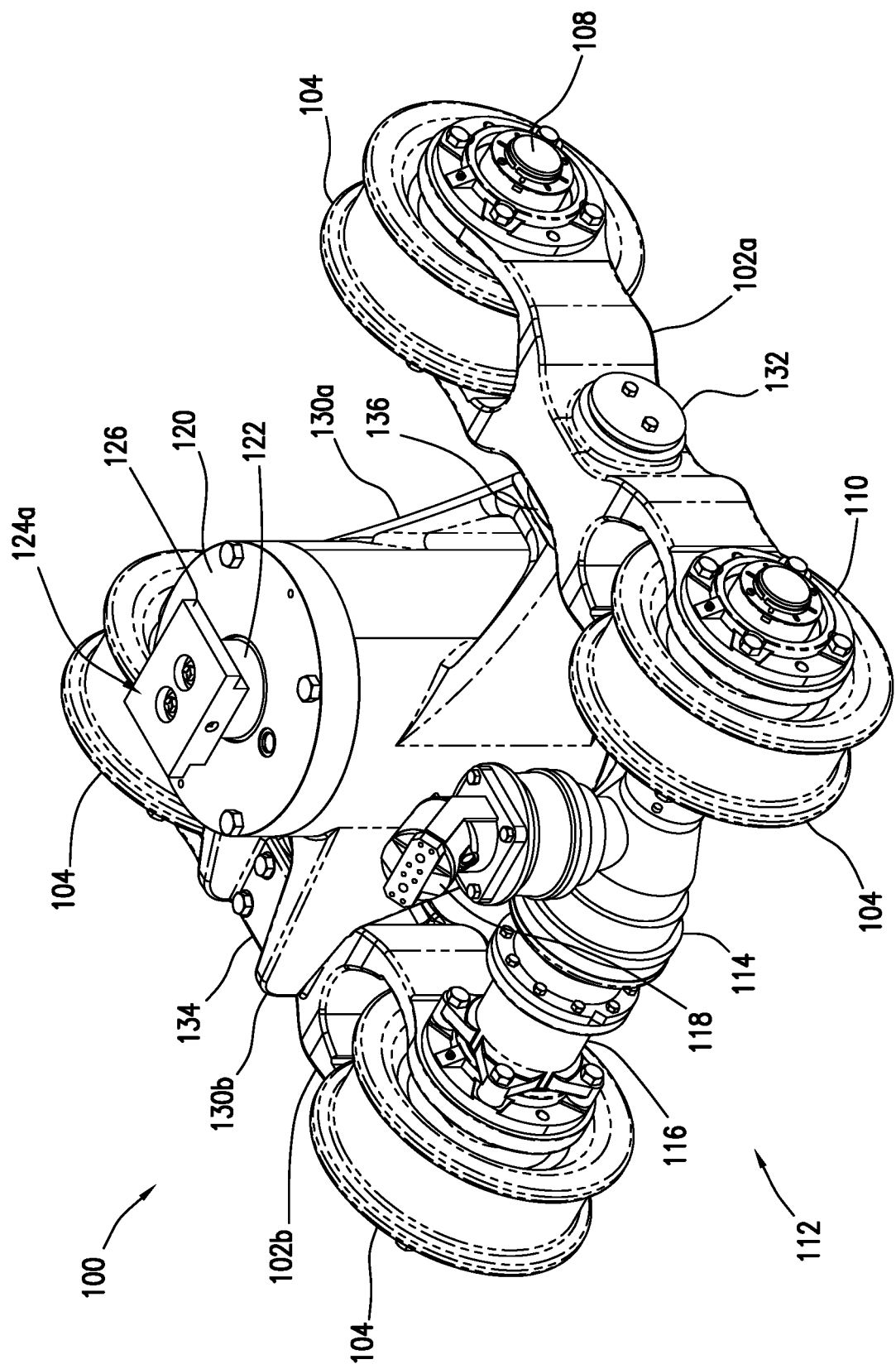
FIG. 1A is a perspective view of a pivoting bogie.
Figure 1B:
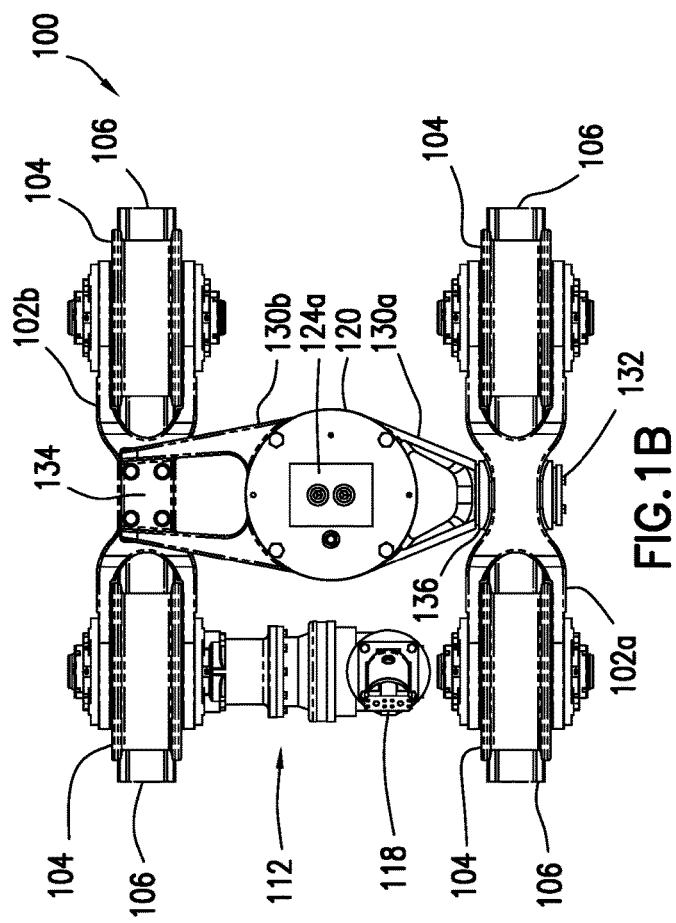
FIG. 1B is a plan view of the pivoting bogie of FIG. 1A.
Figure 1D:
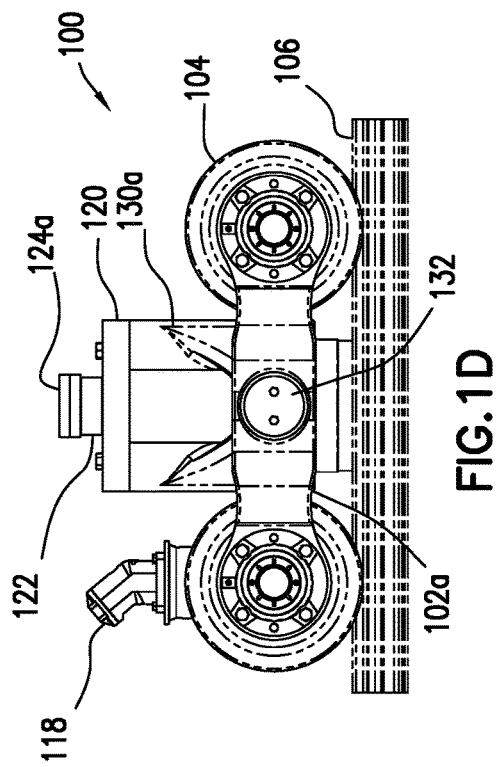
FIG. 1D is another side view of the pivoting bogie of FIG. 1A.
Figure 1C:
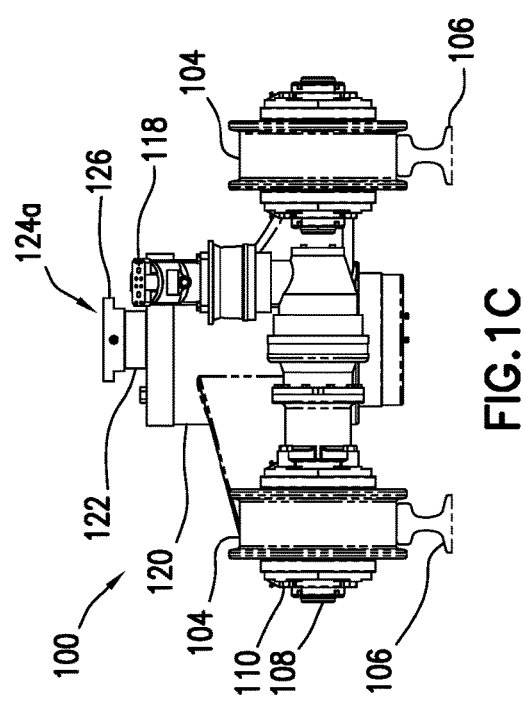
FIG. 1C is a side view of the pivoting bogie of FIG. 1A.

With reference to FIGS. 1A-1D, a bogie with a pivoting wheel truck, in accordance with certain aspects of the present disclosure, will now be described. Bogie 100 (also referred to as a driven trolley assembly or pivoting bogie) includes side frames 102a and 102b, each having two wheels 104 coupled therewith. Wheels 104 are configured (i.e., shaped, sized and/or arranged) to couple with rail tracks 106 (e.g., crane rail), as shown in FIGS. 1B-1D. Wheels 104 are coupled with side frames 102a and 102b via wheel axles 108 and bearings 110 (e.g., tapered roller bearings). In certain aspects, bearings 110 are lubricated wheel roller bearings that provide for minimal breakaway friction. In some such aspects, the wheel 104 loads are limited to a predetermined level, which extends life of the wheels 104. In the embodiment shown in FIGS. 1A-1D, wheels 104 are not coupled with one another via an axle. While bogie 100 is shown and described as having four wheels, total, and two wheels coupled with each side frame 102a and 102b, one skilled in the art would understand that the bogies disclosed herein are not limited to this particular configuration and may include a different number of total wheels and a different number of wheels coupled with each side frame.

Bogie 100 includes hydraulic drive 112 coupled with at least one wheel 104 for driving wheels 104 to move bogie 100 along tracks 106. Hydraulic drive 112 includes hydraulic motor and gearbox 114 coupled with drive adapter 116 which is, in-turn, coupled with wheels 104. In operation, hydraulic fluid is provided to and drives hydraulic motor and gearbox 114 which, in-turn, drives drive adapter 116 which, in-turn, drives the wheels 104 that are coupled therewith. Hydraulic drive 112 includes hydraulic fluid port 118 where hydraulic fluid may be input into hydraulic motor and gearbox 114, such as through a hydraulic hose. While bogie 100 is shown and described as being driven via a hydraulic drive, one skilled in the art would understand that the bogies disclosed herein are not limited to being hydraulically driven and may be driven via other motive forces.

Figure 1E:
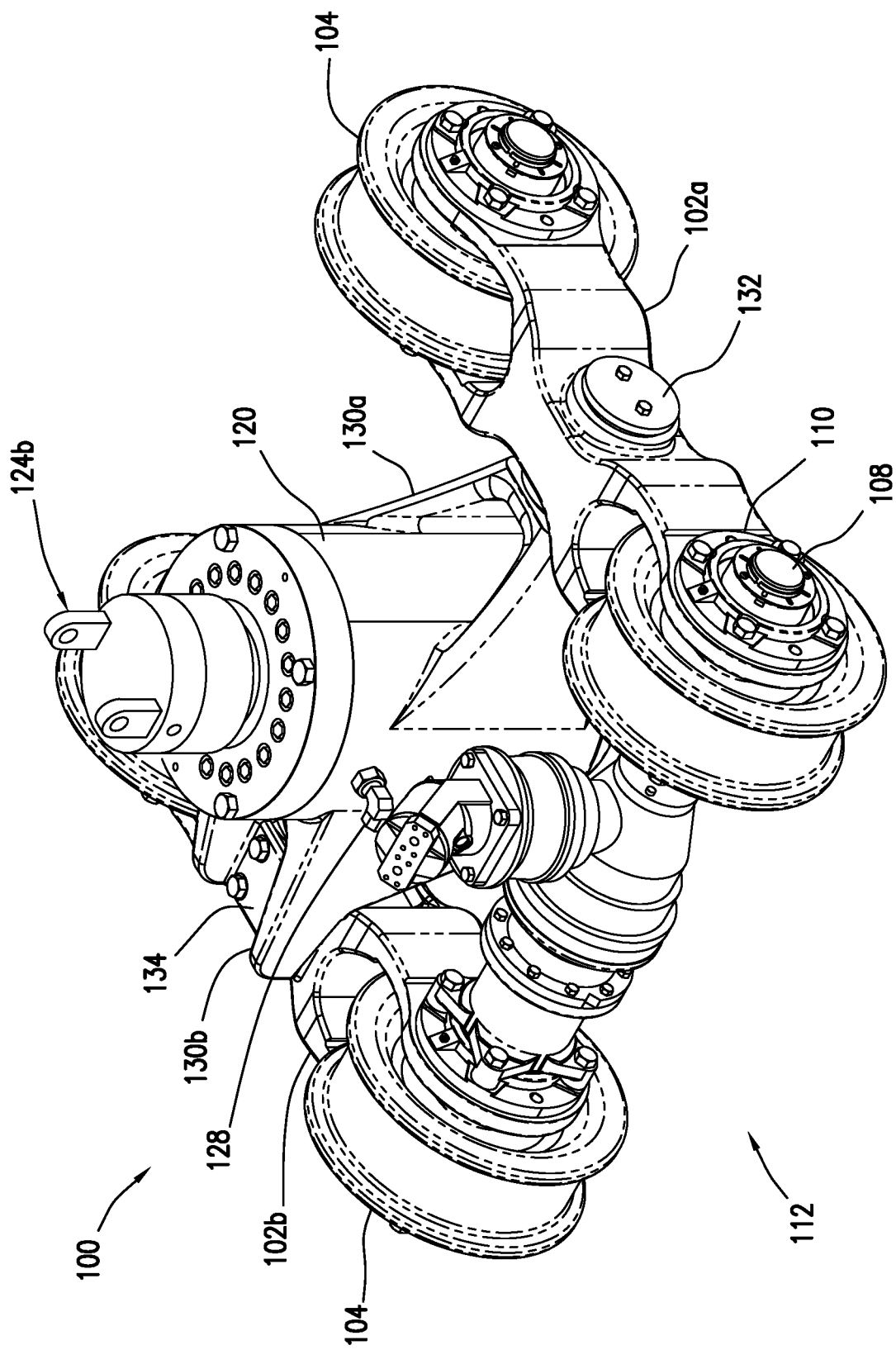
FIG. 1E is another perspective view of a pivoting bogie.

The bogie includes a lift member. As shown in FIGS. 1A-1D, the lift member of bogie 100 includes hydraulic lift cylinder 120 with rod 122 for lifting cradled vessels, as described in more detail below. In the embodiment shown in FIGS. 1A-1D, hydraulic lift cylinder 120 includes cradle coupler 124a having a flange 126. Whereas, in FIG. 1E bogie 100 includes cradle coupler 124b. However, one skilled in the art would understand that other lift members suitable for selectively lifting cradled vessels may be used. The lift members disclosed herein are capable of entering at least two positions, including a retracted (non-lifting) position, such as where the lift member is clear of (e.g., not in engagement with) a cradle, and an extended (lifting) position, such as where the lift member is in engagement with a cradle.

The hydraulic lift cylinder of the bogies disclosed herein is rigidly coupled to one of the side frames and pivotably coupled with the other of the side frames. In the embodiments shown in FIGS. 1A-1E, hydraulic lift cylinder 120 is coupled with central frame 130b which is, in-turn, rigidly coupled with side frame 102b, at rigid coupling 134. Rigid coupling 134 may be welding, bolting, another rigid connection, or combinations, thereof. In some aspects, rather than rigid coupling 134, central frame 130b and side frame 102b are an integral, one-piece construction. Hydraulic lift cylinder 120 is also coupled with central frame 130a which is, in-turn, pivotably coupled with side frame 102a via a pivotable connection, pivot pin 132.

In operation of bogie 100, hydraulic fluid is provided to hydraulic lift cylinder 120, such as via port 128 (shown in FIG. 1E), to lift rod 122 until cradle coupler 124a or 124b engages with a cradle (e.g., a cradle that is cradling a vessel). Upon engagement with the cradle (not shown), further lifting of rod 122 results in a lifting of the cradle and any vessel supported thereon.

The combination of side frame 102b and the wheels 104 coupled therewith is collectively referred to herein as a "rigid wheel truck" or a "static wheel truck", as side frame 102b and the wheels 104 coupled therewith are static relative to the position of hydraulic lift cylinder 120 during operation thereof (with, of course, the exception of rotation of wheels 104), as a result of rigid coupling 134.

The combination of side frame 102a and the wheels 104 coupled therewith is collectively referred to herein as a "pivoting wheel truck" or an "articulating wheel truck", as side frame 102a and the wheels 104 coupled therewith are movable (pivotable) relative to hydraulic lift cylinder 120 (and to "static wheel truck") during operation, as a result of pivot pin 132. That is, as side frame 102a is connected with hydraulic lift cylinder 120 and central frame 130a via pivot pin 132, pivot pin 132 allows "pivoting wheel truck" to pivot, move, or otherwise articulate about pivot point 136 relative to hydraulic lift cylinder 120, central frame 130a, and the static wheel truck during operation of bogie 100. With pivot pin 132 allowing such movement of the pivoting wheel truck, the load on bogie 100 is equally shared by all wheels 104 (i.e., each wheel 104 bears the same amount of load as the other wheels 104 of bogie 100). Pivot pin 132 provides for even distribution of the load on bogie 100 (i.e., load held via hydraulic lift cylinder 120, such as a cradled vessel). In certain aspects, the present disclosure provides for bogies having at least one wheel truck (i.e., frame coupled with wheels) that is pivotable or otherwise movingly or articulatingly coupled with the lifting mechanism (e.g., hydraulic lift cylinder) and/or other portions of the bogie. The present disclosure also provides for bogies configured for even distribution of load bearing amongst all wheels of the bogie, even if the bogie is traversing on uneven track (e.g., parallel tracks at different elevations).

Additionally, when multiple such bogies are connected in a train, discussed in more detail below, the hydraulic lift cylinder 120 can act to equalize load between the multiple bogies. In some such aspects, the bogies do not use or rely on springs to equalize load between the multiple bogies.

As would be understood by one skilled in the art, multiple bogies 100 can be connected together and aligned along a track to form a "bogie train." For example, connecting links (e.g., tow bars/beams) may connect multiple bogies 100 together to form such a bogie train. Further, multiple of such bogie trains (e.g., two or three) may support a cradled vessel. In some such aspects, each bogie train extends parallel to each of the other bogie trains.

Thus, in some embodiments, the bogie 100 disclosed herein includes: (1) a pivot axle (pivot pin 132) that ensures that the load on the bogie 100 is shared on all wheels 104 even in circumstances where the shipyard rail tracks are not level (i.e., are at different elevations); (2) a hydraulic suspension system (hydraulic lift cylinder 120) for lifting and suspending vessels above the shipyard; (3) an integral hydraulic drive assembly (hydraulic drive 112) for moving the bogie 100; or (4) combinations thereof. Further, each bogie 100 can be configured to be readily connectable into a linked train of bogies, as is descried in more detail below. The bogie 100 can include tow bars configured to connect the bogie to other bogies for transport when the bogies are not connected with a cradle or vessel.

Table 1, below, presents specifications of an exemplary bogie having a pivoting wheel truck. One skilled in the art would understand that the bogies disclosed herein are not limited to these particular specifications, which are provided for exemplary purposes only.

TABLE 1

Pivoting Bogie Specifications

| Specification | |
|---|---|
| Drive Speed | 287 m/M (9.40 ft/min) |
| Maximum Wheel Load (per wheel) | 45 Te (99.2 kip) |
| Lift Cylinder Capacity | 180 Te (397 kip) |
| Lift Cylinder Stroke | 203 mm (8.0 in) |
| Operating Pressure | 345 bar (5000 psi) |
| Proof Pressure | 518 bar (7500 psi) |
| Approximate Weight | 1806 kg (3982 lbs) |

Shipyard

Figure 2A:
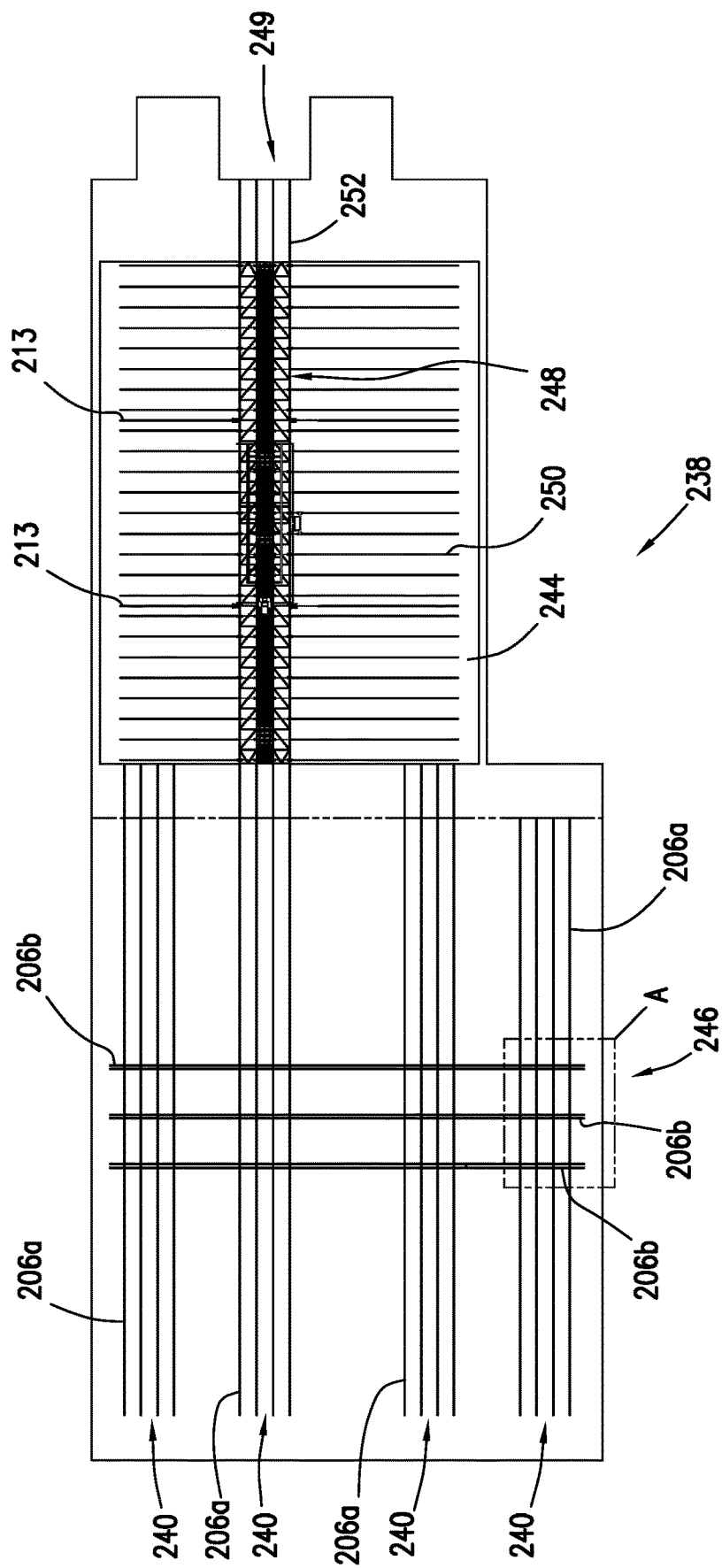
FIG. 2A is a plan view of a shipyard.

FIGS. 2A-2C depict an exemplary shipyard 238, and details thereof, where the bogie transfer systems disclosed herein may be used for moving vessels. In some aspects, the shipyard, or portions, aspects, or components thereof, form a portion of the vessel transfer systems disclosed herein. Shipyard 238 includes lateral transfer pit 244, which includes lateral transfer system 248 for laterally transferring vessels, and yard 246 (e.g., repair yard). A vessel may be moved into pit 244 from shiplift area 249. Yard 246 includes bays 240, which may be repair bays for repairing ships. Each bay 240 includes tracks 206a. As shown, each bay 240 includes four tracks 206a. However, one skilled in the art would understand that each bay of a shipyard may include more or less tracks than four.

Shipyard 238 also includes three sets of two tracks 206b, which are shown as extending perpendicular to tracks 206a. Tracks 206a may be referred to as longitudinal (x-direction) tracks, and tracks 206b may be referred to as lateral (y-direction) tracks. The bogies disclosed herein (e.g., bogie 100) may couple with the tracks 206a or tracks 206b to move there-along. Thus, the bogie transfer system disclosed herein may, in some embodiments, be configured to move vessels both longitudinally and laterally, i.e., both in the x- and y-directions. While shown as including three sets of two lateral tracks, one skilled in the art would understand that the shipyards that may be used with the bogie transfer system herein may include a different number of total lateral tracks and a different number of tracks per set of lateral tracks. In FIGS. 2B and 2C, the intersection between tracks 206a and 206b is depicted, including transition rail sections 206c. In some aspects, each set of lateral rails includes mounting hardware and removable cross-over pieces used to cross over longitudinal rail 206a sections.

One skilled in the art would understand that shipyard 238 may include any number of additional features including, but not limited to, a shiplift (e.g., at shiplift area 249) with an associated control and power house and associated chain jacks, such as is shown in the incorporated U.S. Provisional Patent Application No. 62/591,013 (the '013 Application); a crane rail system, such as is shown in the '013 Application; and a pile foundation, such as is shown in the '013 Application. For example, shipyard 238 may include a shiplift such as is disclosed in U.S. patent application Ser. No. 15/817,876, entitled "Shiplift Platform with Moveable Connectors for Connecting with Piers", filed on Nov. 20, 2017, the entirety of which is incorporated herein by reference.

In operation, lateral transfer system 248 is used to laterally position a cradled vessel to be aligned with a desired bay 240. For example, a vessel and cradle may be moved longitudinally, such as by a bulldozer, on rails 252 (e.g., from a shiplift) and into position over lateral transfer system 248. Lateral transfer system 248 may include rails that couple with wheels of the cradle that is supporting the vessel. Lateral transfer system 248 (also referred to has a lateral transfer cradle or lateral transfer carriage) may then be moved laterally along rails 250 to align lateral transfer system 248, and hence the vessel and cradle supported thereon, with the desired longitudinal bay of bays 240. As described in more detail below, lateral transfer system 248 may be moved laterally using rack and pinion bogies coupled with gear racks 213. After alignment with the desired longitudinal bay of bays 240, the vessel and cradle may then be moved off of lateral transfer system 248 and onto rails 206a of the desired bay 240. For example, a bulldozer may be used to pull the vessel and cradle off of lateral transfer system 248 onto tracks 206a. As would be understood by one skilled in the art, the cradle may include wheels for coupling with tracks 206a, such that the cradle can be moved along tracks 206a. When the vessel and cradle are aligned with tracks 206b, the vessel and cradle can then be moved laterally along tracks 206b via the pivotable bogies as described herein (e.g., bogie 100).

One skilled in the art would understand that the bogie systems disclosed herein are not limited to use in the shipyard shown and described with respect to FIGS. 2A-2C and may be used at a variety of shipyards configured for use with bogie transfer systems, or even used in other, non-shipyard, applications.

Cradle

The vessel transfer system disclosed herein, in some aspects, includes structural cradles configured to support the vessel and to interface with the bogies. The cradle weldment may be designed to use blocking beams and wood blocking to conform to the shape of the vessels to be transferred and comply with the vessels blocking plan.

Figure 3A:
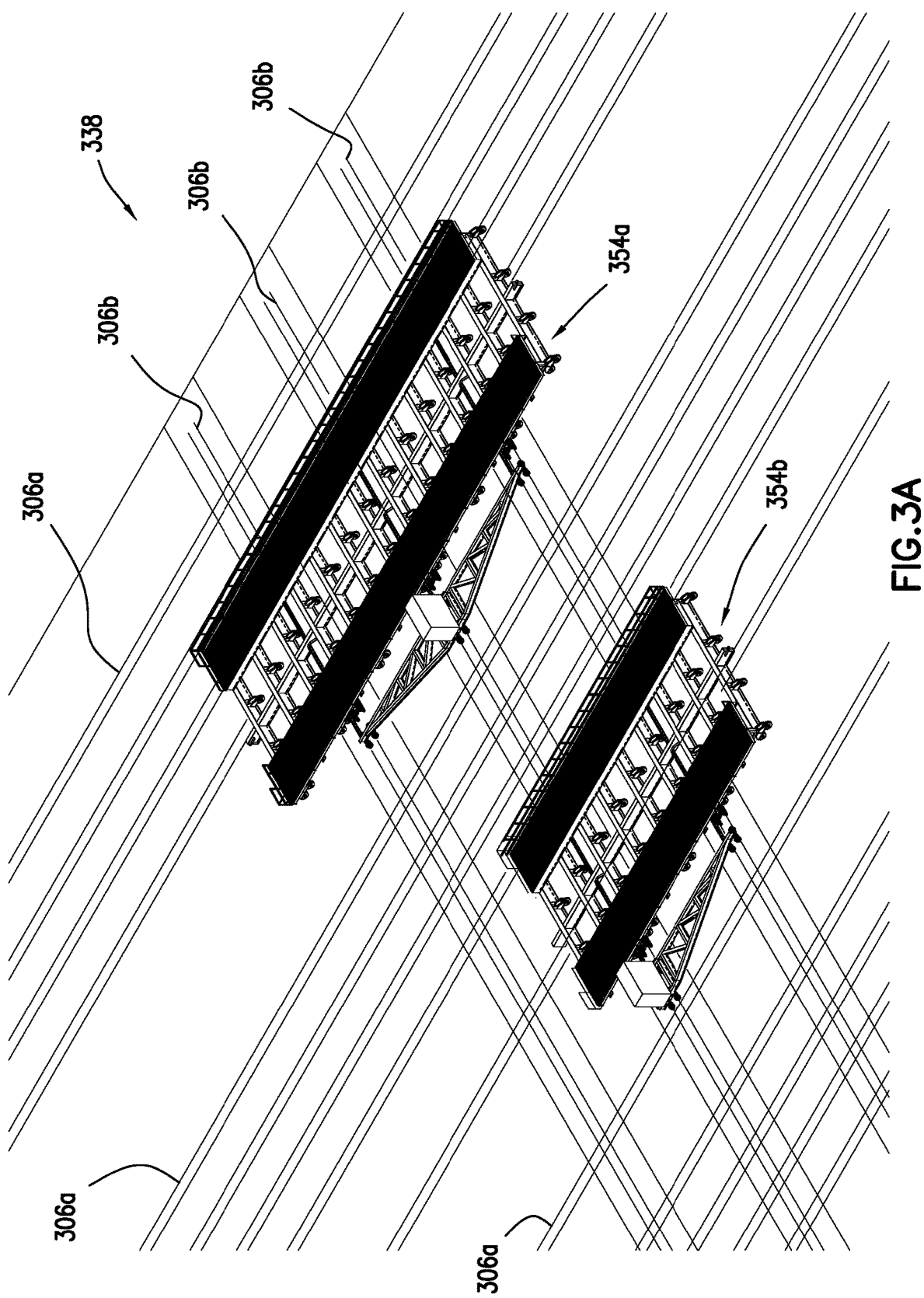
FIG. 3A is a perspective view of shipyard having bogie modules engaged therewith.

FIG. 3A depicts two cradles 354a and 354b coupled with rails 306b at shipyard 338. Cradles 354a and 354b are of different size for supporting different vessels of different sizes and weights. Cradles 354a and 354b can be moved along rails 306a via a bulldozer and along rails 306b via the bogies disclosed herein.

Figure 3B:
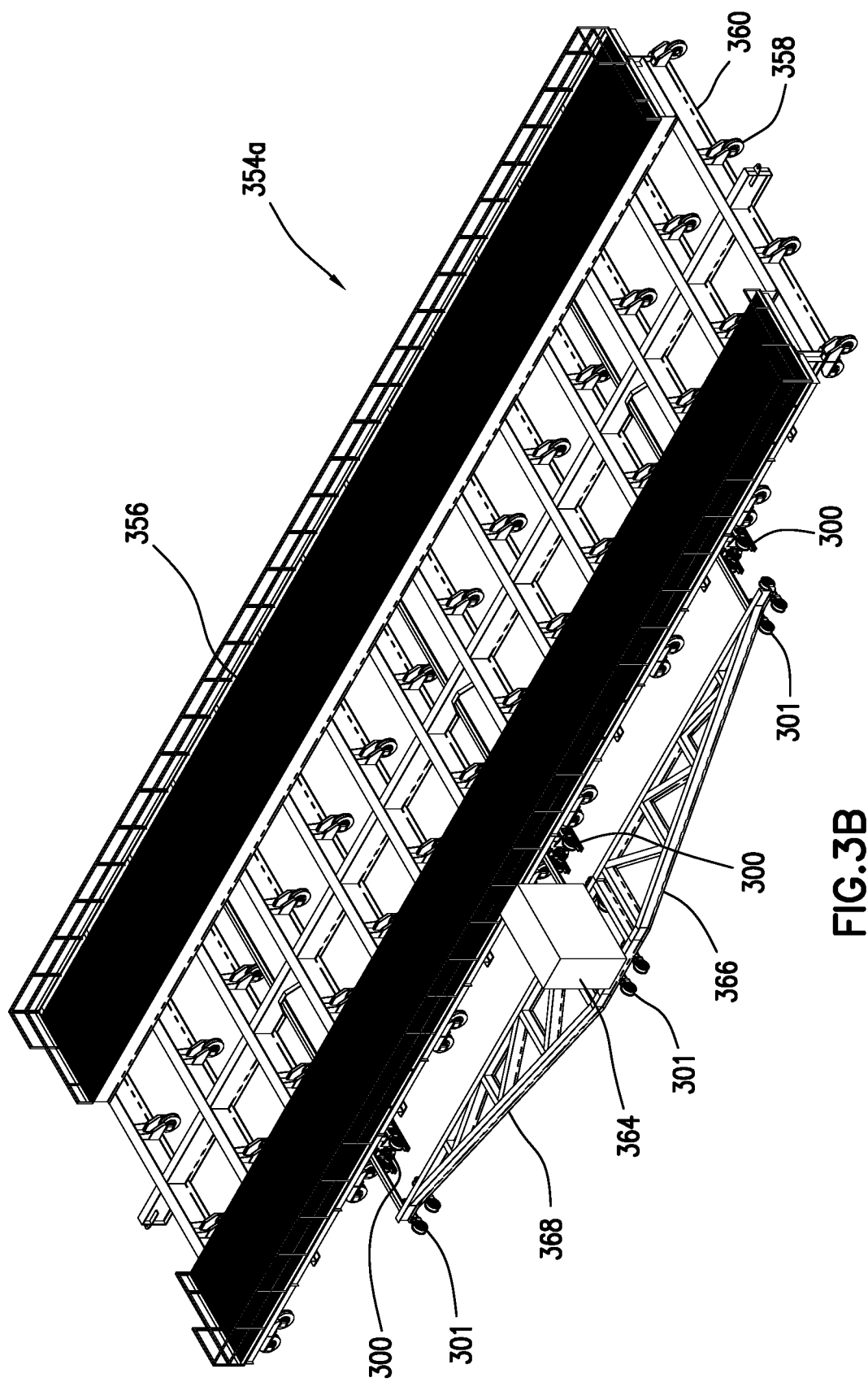
FIG. 3B is a perspective view of a bogie module.

FIG. 3B depicts cradle 354a (also referred to as a carriage), including cradle frame 360 with a plurality of wheels 358 (e.g., carriage wheels) coupled therewith for moving cradle 354a along tracks 306a. Cradle 354a may support a ship or other such vessel on a top of frame 360. Cradle 354a includes grating walk surface 356 with hand rails for access to the cradle 354a, such as during blocking, installation and inspection.

Coupled with cradle 354a are three bogie trains 362, as indicated in FIG. 3C, each bogie train 362 including multiple bogies 300 arranged in alignment with other bogies 300 of that train 362. Each bogie 300 may the same or substantially the same as bogie 100.

The bogie trains 362 may be coupled with lateral transfer drive assembly 366, which includes hydraulic power unit 364 mounted on frame 368. Hydraulic power unit 364 is hydraulically coupled with each bogie 300 to provide hydraulic power thereto, as described in more detail elsewhere herein. Hydraulic power unit 364 and frame 368 are supported by wheels 301. The combination of the cradle engaged with one or more bogie trains and the lateral transfer drive assembly is referred to herein as a "bogie module." FIG. 3C depicts a top view of cradle 354a. As is evident from FIG. 3C, each bogie train 362 includes two bogies 300 that span the spacing between the rails coupled therewith. FIGS. 3D and 3E depict side and end views of cradle 354a.

While cradle 354a is shown as including three bogies trains 362, one skilled in the art would understand that different numbers of bogies trains may be used. For example, cradle 354b of FIG. 3A includes two bogie trains. Furthermore, in some aspects, multiple cradles can be used to cradle the same vessel, such as for relatively large vessels. In some such aspects, the multiple cradles can be linked together via connecting links (e.g., tow bars/beams).

Operation of the Bogie Transfer System

In certain aspects, the present disclosure provides for a vessel transfer system that is capable of moving cradled vessels in both longitudinal and lateral directions (x and y directions) in a shipyard. The vessel transfer system disclosed herein may provide for transport vessels on and off of shiplift platforms and into working bays both in the longitudinal and the lateral directions, may include linkage members that facilitate movement of unloaded bogie trains, and may be configured to provide efficient and safe movement of vessels within a shipyard.

In operation, a vessel is blocked onto the frame 360 (e.g., a welded steel frame) of cradle 354a. Bogie trains 362 are run underneath the cradle 354a with the rods 122 retracted. After positioning bogies 300 at the desired location, the rods 122 are extended to engage with the cradle 354a. Frame 360 may be configured (shaped, sized, positioned and/or arranged) to mate with bogies 300. For example, bogies 300 may be connected to the cradle 354a by capturing the lift cylinder rod flange (e.g., flange 126) within cradle mountings on the frame 360.

Once coupled with the cradle 354a, rods 122 of the lift cylinders 120 are raised or extended via application of hydraulic pressure from the hydraulic power unit 364 until the cradle 354a, supporting the vessel, is fully lifted off of and above the surface of the shipyard and the tracks thereof.

As previously descried, each bogie 300 is equipped with an integral drive assembly (i.e., hydraulic drive 112) that is coupled with and powered by a hydraulic power unit (HPU) 364. Hydraulic power unit 364 is connected to the "last" bogie in a bogie train 362 and towed there-behind. As such, once lifted off of and above the surface of the shipyard and the tracks thereof, the cradle 354a, supporting the vessel, can be moved laterally within the shipyard (e.g., along tracks 106b) by moving the bogies trains 362 along the tracks. Hydraulic fluid may be provided to the hydraulic motor and gearbox 114 of each bogie 300 to move the bogies 300 along the tracks; thereby, moving the cradle 354a, supporting the vessel.

Once moved to the desired location within the shipyard 338, the rods 122 of the lift cylinders 120 are lowered or retracted, via withdrawal of hydraulic pressure using the hydraulic power unit 364, until the wheels 358 of cradle 354a, supporting the vessel, are fully lowered and engaged with the desired longitudinal tracks 306a at the shipyard 338. Thus, the use of hydraulically controlled lift cylinders to lift and lower the cradled vessel provides for the ability to remove the bogie module from beneath the cradled vessel, such that the same bogie module can be used for multiple repair berths and vessels. As such, the bogie module can be used to transfer vessels laterally within the shipyard, such as from one working bay to another working bay.

Hydraulic System

Figure 4A:
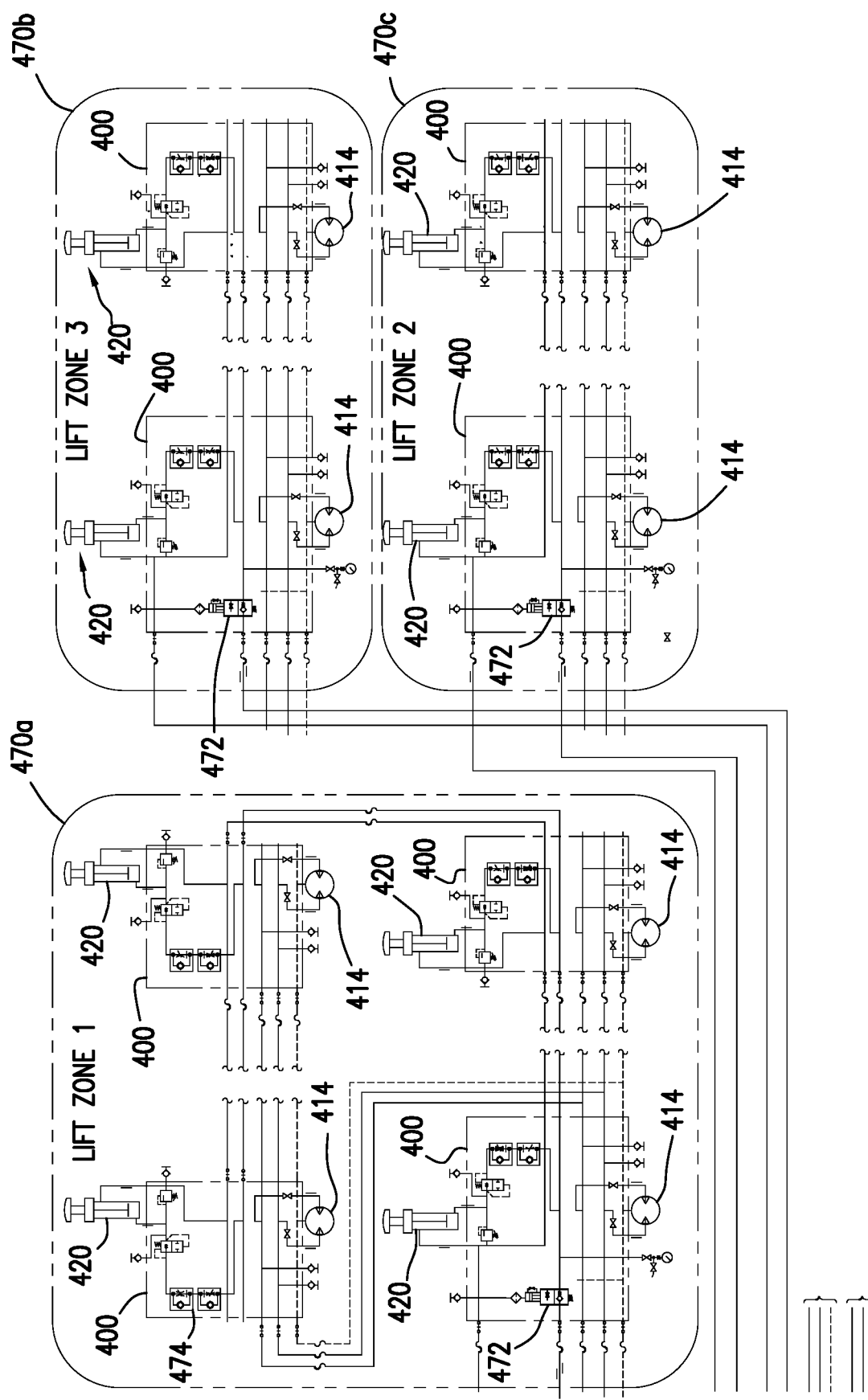
FIG. 4A is a hydraulic schematic of bogies assembled into different zones and hydraulically coupled with a hydraulic power unit.
Figure 4B:
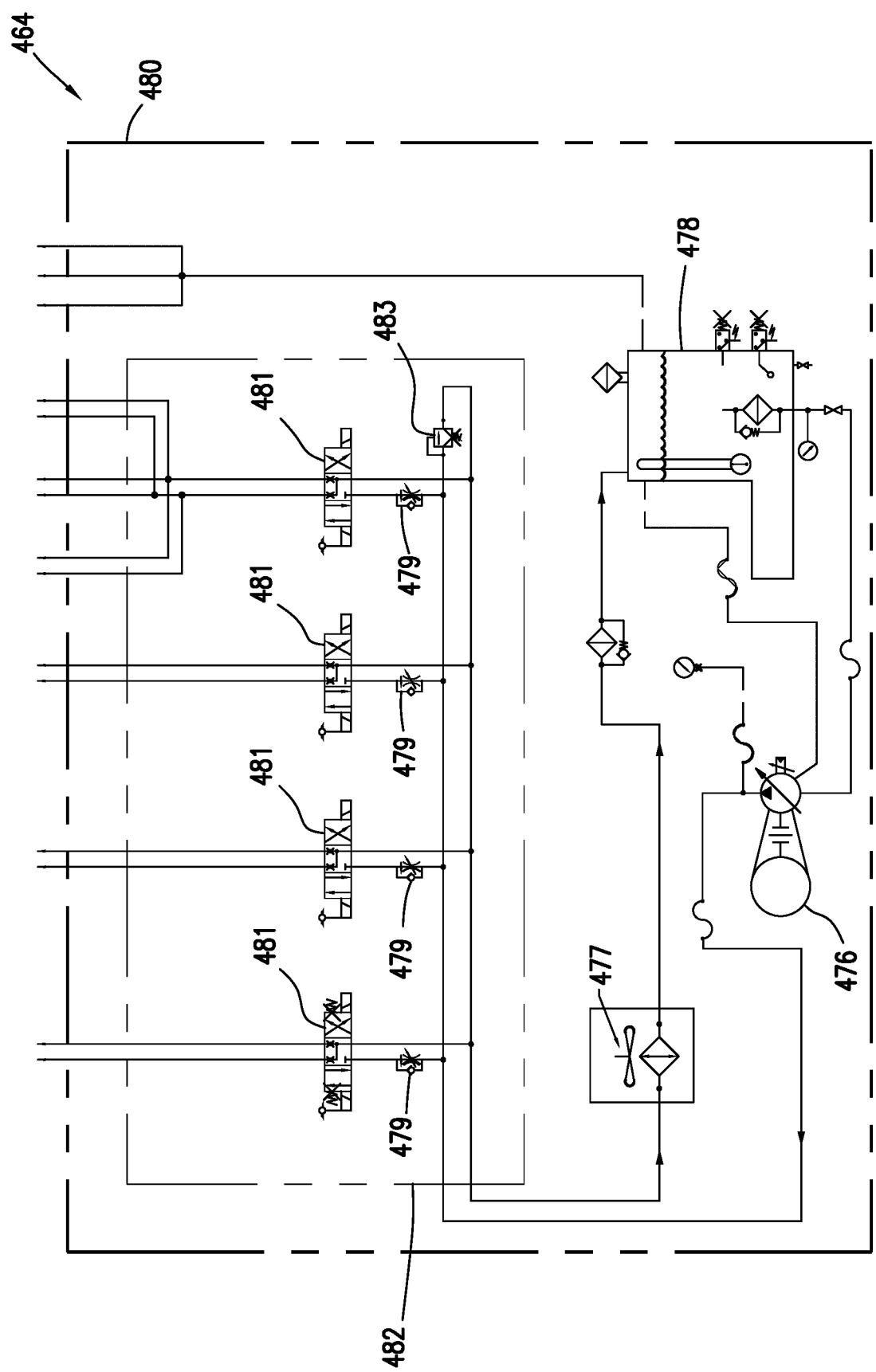
FIG. 4B is a hydraulic schematic of the hydraulic power unit hydraulically coupled with the bogies of FIG. 4A and including a control manifold.
Figure 4C:
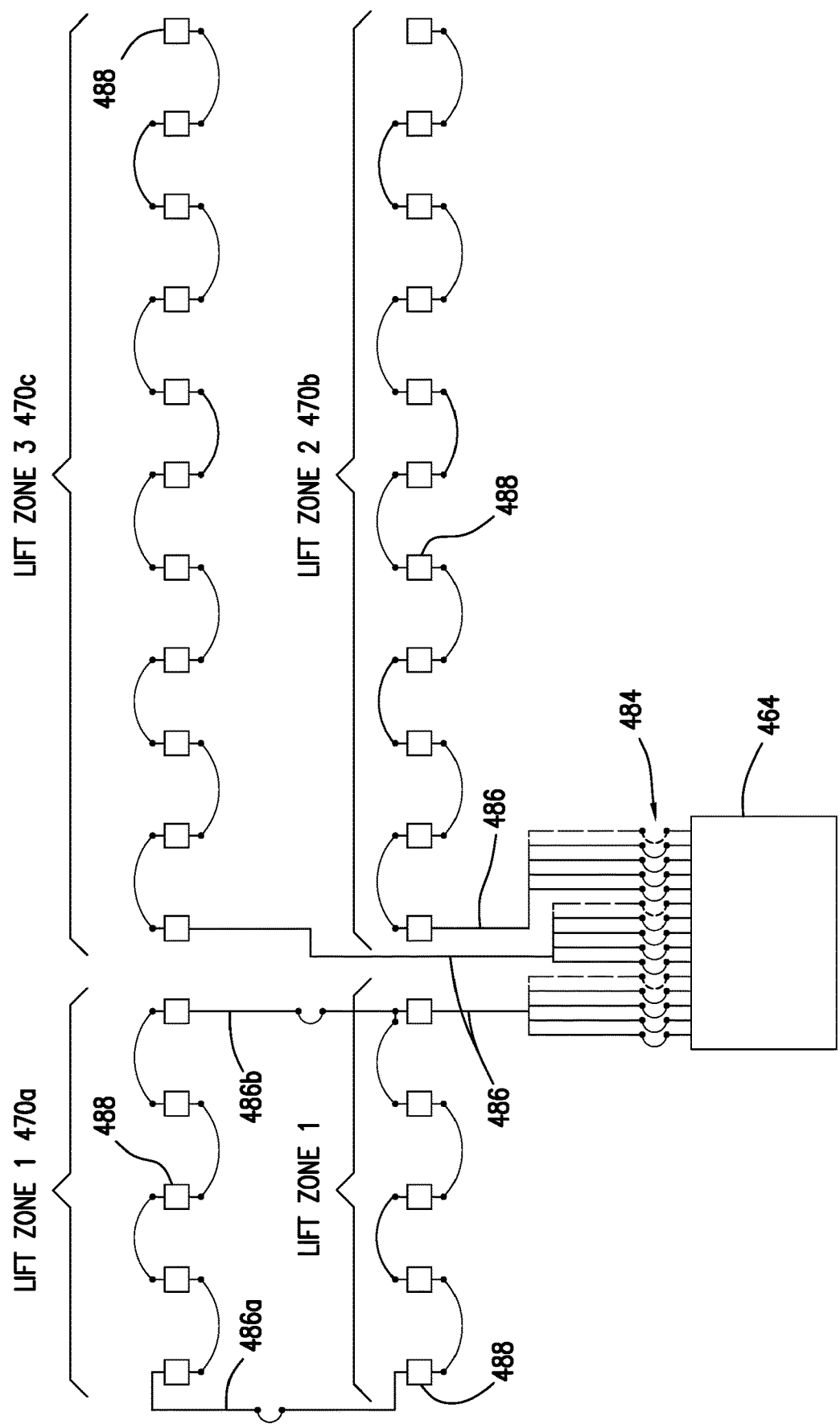
FIG. 4C is a schematic of a manifold and piping layout for the hydraulic communication between the hydraulic power unit and the bogies.
Figure 5F:
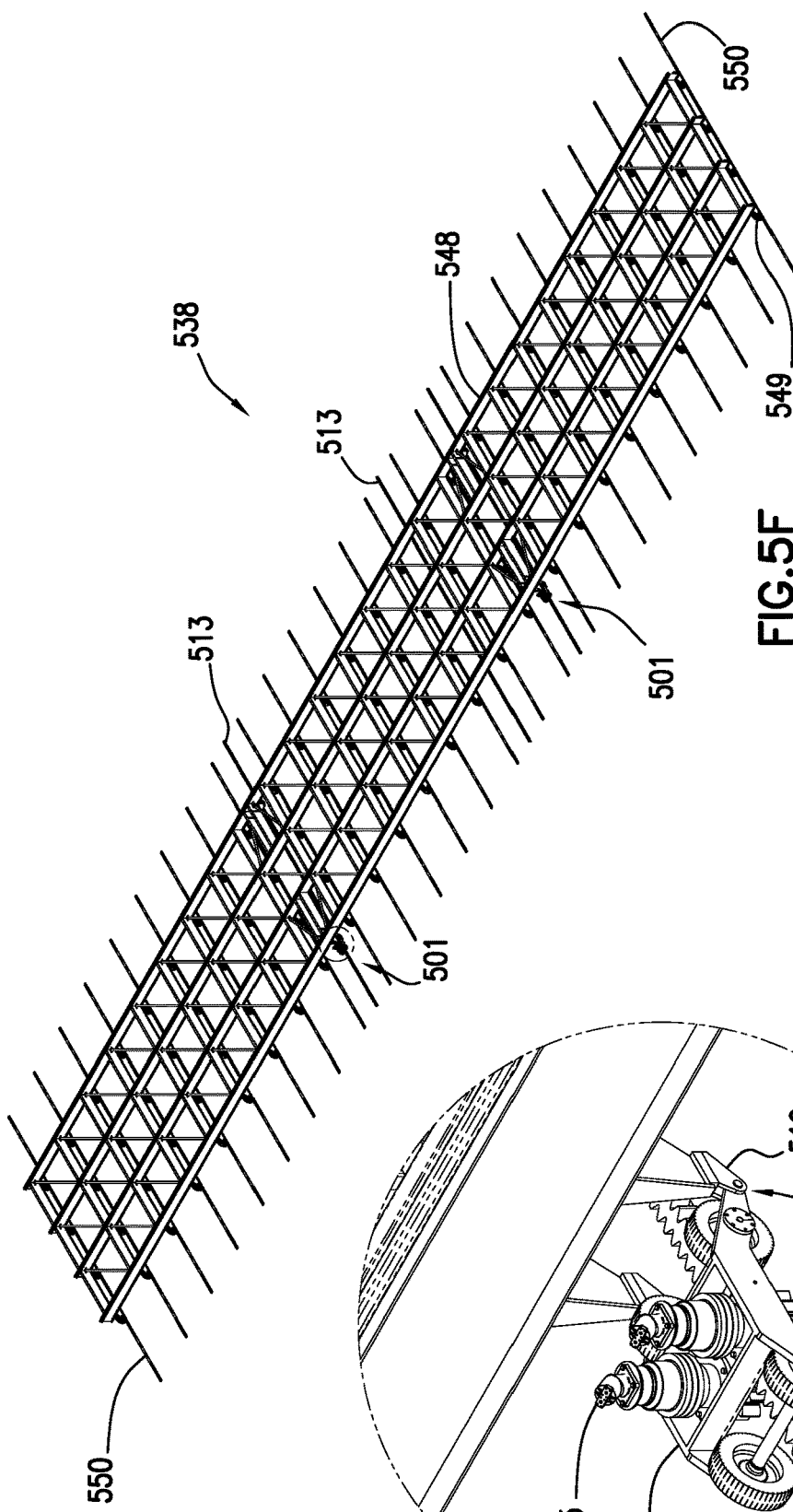
FIG. 5F is a perspective view of a portion of a shipyard including a lateral transfer system coupled with rack and pinion bogies.
Figure 5G:
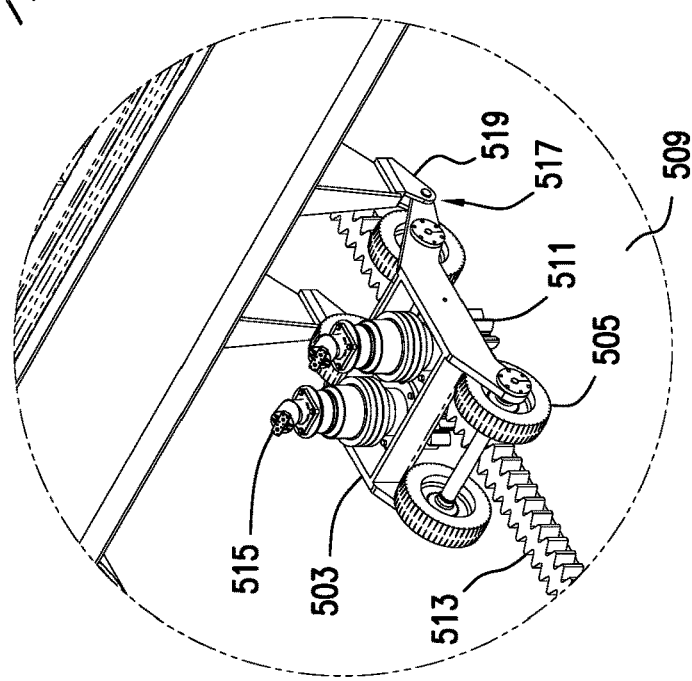
FIG. 5G is a detail view of FIG. 5F showing a rack and pinion bogie coupled with a lateral transfer system.

In certain aspects, the movement of the bogies along the tracks, the raising and lowing of the hydraulic lift cylinders, or combinations thereof is hydraulically controlled, such as via the hydraulic power unit. In some such aspects, all bogies are hydraulically controlled by a single hydraulic power unit. With reference to FIGS. 4A-4C, an exemplary hydraulic system that controls the bogies will now be described. FIGS. 4A and 4B, together, form a hydraulic schematic of the connections between bogies and the hydraulic power unit, and FIG. 4C is a schematic showing a manifold and piping layout that may be used to provide for flow of hydraulic fluid between the hydraulic power unit and the bogies.

In some aspects, the vessel transfer systems disclosed herein are configured for protection of vessels from overloads caused by hard point loading during transfer. This may be achieved via the balancing of load of within and amongst zones of bogies. When lifting a cradled vessel for transfer, the bogies of the bogie module are arranged and/or isolated into multiple groups of bogies, also referred to as "zones." As shown in FIG. 4A, bogies 400 are separated into three zones, including zones 470a, 470b, and 470c. The bogies 400 within each respective zone are hydraulically interconnected, such that the hydraulic lift cylinders 420 within each zone are hydrostatically connected with the other hydraulic lift cylinders 420 within that zone. All hydraulic lift cylinders 420 within a single zone, in some embodiments, share equal load pressure. All hydraulic lift cylinders 420 within a single zone can be operated simultaneously, such that the hydraulic lift cylinders 420 within a single zone operate in unison to provide a "single-point" of lift to the cradled vessel within that zone. Thus, a bogie module with three zones 470a-470c provides a "three-point" lifting system, with each zone of bogies defining a single "point" of the three-point lifting system. As such, a cradled vessel hull can effectively be lifted and held in position by a three-point suspension system (bogie module with three zones of bogies). With the three-zoned (three-point) suspension, the total load on each zone can be predefined or predetermined, such that all hydraulic lift cylinders within a single zone are at the same pressure (equal pressure). Such an arrangement maintains the loads on the hydraulic lift cylinders 420, as well as the loads on the structures of the bogies 400, determinant.

Furthermore, such a three-zoned (three-point) suspension simplifies the positioning of the vessel hull, as the hydraulic lift cylinders 420 share load equally within a zone regardless of any changes in the vertical position or angle of the vessel hull. In some aspects, the vessel weight can be determined using the hydraulic pressure calculated to the number of hydraulic lift cylinders 420 connected at each zone 470a-470c. While, in some aspects, the separation of the bogies into zones is preferred, in other aspects, all bogies are grouped into a single zone. As would be understood by one skilled in the art, the number, positioning, and arrangement of bogies within a zone may vary.

In operation, the entire vessel may be lifted or lowered synchronously by actuating each of the three zone load control valves 472 simultaneously. In some aspects, a selector valve can be used such that any single zone or combination of the zones can be actuated. Extending or retracting hydraulic lift cylinders 420 of all three zones simultaneously adjusts the vertical position of the cradled vessel. Load control valves 472 (LCVs, also referred to as load holding valves) within the hydraulic circuit provide for positive load holding at any lifted position of the hydraulic lift cylinders 420. Also shown are flow control valves 474. In some aspects, safety valves, such as flow fuse valves (FF1, as shown in the incorporated '013 Application) are included (e.g., mounted at each hydraulic cylinder lift port) such that, in the event of loss of pressure on any of the hydraulic lift cylinders 420, the safety vales react to shut the circuit and isolate that hydraulic lift cylinder from the remainder of that zone. If fluid rushes through such safety valves too fast, this may be indicative of a broken hose connection to the cylinder and the valve automatically shuts due to excessive pressure drop felt across an orifice stopping the leakage.

Use of such multi-zone, multi-point lifting provides for simultaneous lifting and simultaneous lowering of the cradled vessel and provides for hydraulic suspension of the cradled vessel to distribute the load evenly between the rigid, cradled vessel and the rails at the shipyard. Furthermore, such multi-zone, multi-point lifting provides the bogie module with the ability to accommodate for variations in the rail elevation at the shipyard. For example, zone 470b may be a zone including bogies 400 aligned along and engaged with one rail track and zone 470c may be a zone including bogies 400 aligned along and engaged with another, parallel rail track. If the rail track on which the bogies 400 of zone 470b are engaged is at a different elevation that the rail track on which the bogies 400 of zone 470c are engaged, then the hydraulic lift cylinders 420 within one or both of zones 470b and 470c can lift or lower the cradled vessel such that, even with uneven rail tracks, the cradled vessel may be maintained level or substantially level. As such, use of the hydraulic system to selectively adjust the heights of the hydraulic lift cylinders in selected zones increases the allowable tolerance of variations in rail track levels in the shipyard.

Hydraulic lift cylinders 420 may be double-acting, which allows for full retraction thereof under no-load conditions, e.g., while the vessel hull is resting on the cradle(s). In some aspects, hydraulic lift cylinders 420 include spherical bearing pads at the ends of the rods thereof to accommodate, for example, angles of tilt of the vessel hull with respect to the level of the shipyard (e.g., angles of tilt of up to 2 degrees).

The hydraulic power supply for the bogie module includes hydraulic power unit (HPU) 464, which includes a self-contained, diesel driven hydraulic pump 476, hydraulic fluid reservoir 478, frame 480, cooling fan 477, flow control valves 479, direction control valves 481, relief valve 483, and pendant control unit 482 to provide for power and control of bogie 400 lift and drive functions.

The hydraulic power unit 464 is configured to operate in a shipyard environment, and is constructed to be rugged, simple and reliable. The hydraulic power unit 464 may be mounted on wheels and towed behind a bogie train, as shown in FIGS. 3A-3E. In some aspects, the hydraulic power unit 464 and associated pendant control unit 482 are supplied with an amount of cable that provides an operator thereof with the flexibility to view the transfer of vessels from different locations within the shipyard to improve visibility thereof (e.g., up to 10 meters of cable).

In operation, hydraulic power and control for the drive motors 414 and lift cylinders 420 of the bogies 400 are provided by the same hydraulic power unit, hydraulic power unit 464. The controls and instrumentation for operating the drive assemblies may be mounted on the pendant control unit 482. In some aspects, motor start/stop pushbuttons may be located on the hydraulic power unit 464, and electric control actuators for operating the hydraulic lift cylinders may be mounted on the pendant control unit 482 or may be controlled locally at the hydraulic power unit 464 with manual override levers. The bogies 400 may be controlled to move along the tracks at various speeds, including at relatively slow speeds that provide for fine adjustment or placement of the cradled vessel.

While not particularly called out in FIGS. 4A and 4B, one skilled in the art would understand that the hydraulic system depicted therein may include any of numerous components typically included in hydraulic systems including, but not limited to: relief valves, flow control valves, directional control valves, drain valves, butterfly valves, case drains, drain hoses, suctions hoses, water and dust breathers, return filters, cooling fans, switches, indicators, meters, sensors, gauges (e.g., temperature and/or pressure) and other valves and components of hydraulic systems.

FIG. 4C depicts an exemplary manifold and piping layout for the hydraulic system for controlling bogies. Hydraulic power unit 464 may be in fluid communication with each bogie 400 within each zone 470. Hydraulic fluid may flow to and from hydraulic power unit 464 through hoses 484. As shown, five hoses 484 fluidly communicate between hydraulic power unit 464 and each zone 470. However, for simplicity and clarity of the figure, each of the sets of five hoses are represented by a single line 486 fluidly communicating with each zone. Each set of five hoses includes two hoses that fluidly communicate with lift cylinders (collectively represented by 486a for zone 470a), and two hoses that fluidly communicate with bogie motors and one hose that fluidly communicates with a drain line (collectively represented by 486b for zone 470a). The hoses 486 fluidly communicate between hydraulic power unit 464 and manifolds 488. Each manifold 488 is located on or is in fluid communication with a bogie for providing hydraulic fluid thereto or withdrawing hydraulic fluid therefrom (i.e., to and from the motor and lift cylinder of the bogie). The hydraulic hose arrangement of the hydraulic system disclosed herein may be configured for easy interconnection of bogies and handling of hose assemblies. In some aspects, supporting members for hoses 486 are positioned on bogies 400 and/or tow bars thereof. The hoses 486 may include quick connects/disconnects for selective connection with the hydraulic power unit 464, manifolds 488, or any other hydraulically connected component of the vessel transfer system.

One skilled in the art would understand that the hydraulic system for controlling the bogies herein is not limited to the depicted arrangement and configuration and that other hydraulic systems and arrangements may be used. Furthermore, in some aspects, the bogies are controlled by control mechanisms other than hydraulic control.

Rack and Pinion Drive

Certain aspects of the present disclosure provide for a rack and pinion bogie and to methods of use thereof. The rack and pinion bogie may be used to transfer cradled vessels within the shipyard (e.g., laterally within the shipyard). In some such aspects, the rack and pinion bogie moves a vessel supported on a transfer cradle without use of bulldozers, winches or via hydraulically driving the wheels of the bogie. For example, the rack and pinion bogie may be used to move (e.g., pull) the lateral transfer system 248 shown in FIG. 2A. As such, the rack and pinion bogie may be used to move vessels laterally within a lateral transfer pit (e.g., pit 244) of a shipyard, after the vessel has been pulled from a shiplift (e.g., 249), such as by a bulldozer, and cradled onto a lateral transfer system.

With reference to FIGS. 5A-5G, an exemplary rack and pinion bogie will now be described. Rack and pinion bogie 501 includes frame 503, which forms a drive cart of bogie 501. Wheels 505 are coupled with frame 503 via axles 507, such that wheels 505 rotate freely relative to frame 503. In operation, wheels 505 are engaged with shipyard surface 509 to move there-along.

Bogie 501 includes pinion gears 511. Pinion gears 511 are configured (i.e., shaped, sized positioned and/or arranged) to engage with gear rack 513 of shipyard 538. For example, gear rack 513 may be coupled to (e.g., bolted, welded) or integrally formed with surface 509. Pinion gears 511 are hydraulically controlled via hydraulic drives 515. However, one skilled in the art would understand that pinion gears may be driven via other mechanisms.

Bogie 501 includes bogie connection 517 for coupling with vessel carriages or cradles, such as with lateral transfer system 548, at carriage connection 519. For example, bogie 501 may be pinned, bolted or otherwise coupled with lateral transfer system 548.

In operation, bogie 501 may be coupled with lateral transfer system 548 via connections 517 and 519. Hydraulic drives 515 of bogie 501 may then be supplied with hydraulic fluid to drive pinions 511. As pinions 511 are driven, pinions 511 move along gear racks 513. As pinions 511 move along gear racks 513, wheels 505 move along surface 509, and bogie 501 pulls lateral transfer system 548 and any vessel cradled thereon laterally within shipyard 538. Lateral transfer system 548 includes a plurality of wheels 549 engaged with lateral tracks 550 at the shipyard, allowing lateral transfer system 548 to be moved laterally via bogie 501. In the embodiment shown, four rack and pinion bogies 501 are pulling lateral transfer system 548. However, one skilled in the art would understand that different numbers of rack and pinion bogies may be used to pull lateral transfer system 548, and further that rack and pinion bogies may be used to pull other apparatus. Also, one skilled in the art would understand that the rack and pinion bogies disclosed herein are not limited to the particular structure shown in FIGS. 5A-5G and may take other forms without departing from the scope of this disclosure.

Table 2, below, presents specifications of an exemplary rack and pinion bogie. One skilled in the art would understand that the rack and pinion bogies disclosed herein are not limited to these particular specifications, which are provided for exemplary purposes only.

TABLE 2

Rack and Pinion Bogie Specifications

| Specification | |
| --- | --- |
| Drive Capacity | 20 Te (44 kip) |
| Operating Pressure | 345 bar (5000 psi) |
| Approximate Weight | 667 kg (1470 lbs) |

Exemplary Transfer Sequence

An exemplary vessel transfer sequence using the hydraulically controlled bogie train modules disclosed herein will now be described with reference to FIG. 6.

The transfer sequence includes moving a cradled vessel longitudinally into position over lateral transfer rails in a working bay area of a shipyard, box 623. For example, as is shown in the incorporated '013 Application, a bulldozer may pull a vessel that is supported on a wheeled cradle from a shiplift and onto a shipyard, such that the wheels of the cradle are movably engaged with rail tracks of the working bay area.

The transfer sequence includes positioning the cradled vessel on a lateral transfer system, box 625. For example, as is shown in the incorporated '013 Application, a bulldozer may pull a cradled vessel onto lateral transfer system.

The transfer sequence includes moving the lateral transfer system laterally; thereby, moving the cradled vessel laterally, box 627. For example, as is shown in the incorporated '013 Application, a rack and pinion bogie may pull the lateral transfer system laterally.

The transfer sequence includes transferring the cradled vessel longitudinally from the lateral transfer system onto the repair yard of the shipyard, box 629. For example, as is shown in the incorporated '013 Application, track extensions may be added between cradle tracks on the lateral transfer system and longitudinal tracks in the repair yard, followed by pulling the cradled vessel off of the lateral transfer system and onto the repair yard (e.g., using a bulldozer).

The transfer sequence includes transferring the cradled vessel longitudinally within the repair yard, along the longitudinal tracks, until the cradled vessel is adjacent lateral tracks in the repair yard, box 631. For example, as is shown in the incorporated '013 Application, the cradled vessel may be pulled via a bulldozer until the cradled vessel is adjacent lateral tracks in the repair yard.

The transfer sequence includes positioning hydraulically controlled, pivoting bogie trains underneath the cradled vessel and blocking in the working bay, box 633. For example, as is shown the incorporated '013 Application, bogies (e.g., bogies 100, 300, 400, as shown and described above) may be positioned underneath the cradled vessel. In some such aspects, removable track sections are removed from the longitudinal tracks and placed in the lateral tracks to allow the bogies to move into position underneath the cradled vessel.

The transfer sequence includes raising the hydraulic lift cylinders of the bogies into engagement with the cradle(s) using the HPU, box 635. For example, the hydraulic lift cylinders can be raised and engaged with the cradle in the same or substantially the same way as described with reference to FIGS. 1A-1E and 4A-4C, and as shown in the incorporated '013 Application.

The transfer sequence includes mechanically locking the hydraulic lift cylinders of the bogies in place into the cradle(s) using a built-in locking mechanism, box 637. The built-in locking mechanism may be or include, for example, at least a portion of cradle coupler 124b.

The transfer sequence includes lifting the cradled vessel and moving the cradled vessel laterally from one working bay to another working bay, box 639. For example, the same hydraulic lift cylinders can be raised to lift the cradled vessel until the cradled vessel is clear of the shipyard and rail tracks in the same or substantially the same way as described with reference to FIGS. 1A-1E and 3A-4C, and as shown in the incorporated '013 Application.

The transfer sequence includes retracting the hydraulic lift cylinders to set down the cradled vessel in the new working bay using the HPU, box 641. For example, the hydraulic lift cylinders can be lowered to set down the cradled vessel until the cradled vessel is engaged with the rail tracks of the shipyard in the same or substantially the same way as described with reference to FIGS. 1A-1E and 3A-4C, and as shown in the incorporated '013 Application.

The transfer sequence includes mechanically unlocking the bogie lift cylinders from the cradle frame and further retracting the hydraulic lift cylinders and driving the bogie trains out from under the cradle to a safe distance (e.g., clear of the vessel and cradle), box 643. For example, the hydraulic lift cylinders can be unlocked and the bogie hydraulically driven on the lateral tracks in the same or substantially the same way as described with reference to FIGS. 1A-1E and 3A-4C, and as shown in the incorporated '013 Application.

The transfer sequence includes moving the cradled vessel longitudinally to a new location clear of the lateral transfer rails at the shipyard, box 645. For example, a bulldozer can be used to pull the cradled vessel longitudinally, as shown in the incorporated '013 Application.

The steps, 623-645, may be repeated any number of times to move additional cradled vessels using the same rack and pinion bogie, the same pivoting bogie trains, and the same lateral rails, as indicated by line 649. Following the transfer sequence, any number of vessels can be moved to different locations in a shipyard. The transfer sequence can be implemented using the hydraulically controlled pivoting bogie modules and rack and pinion bogies as are described herein. In some implementations of the methods disclosed herein, the bogie structures, wheels, bearings, hydraulics, and gears are never immersed in sea water.

One skilled in the art would understand that the methods of transferring vessels disclosed herein is not limited to this particular transfer sequence, and that some of the steps of the transfer sequence may be eliminated and additional steps may be added to the transfer sequence.

While the pivoting bogies and rack and pinion bogies are shown and described herein in relation to lifting cradled vessels and moving the vessels on rails within a shipyard, one skilled in the art would understand that these bogies are not limited to the particular applications described, and may be used in other applications, such as other applications where relatively heavy loads are in need of lifting and/or transport. Furthermore, while it is clear in light of the above discussion that the pivoting bogies and rack and pinion bogies disclosed herein may be used together, one skilled in the art would understand that these bogies are not limited to being used together and may be used separately.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A vessel transfer system, the system comprising:
    a bogie, the bogie including a first wheel truck including a first side frame and a first wheel coupled with the first side frame, a second wheel truck including a second side frame and a second wheel coupled with the second side frame, and a lift member coupled with each of the first and second side frames;
    wherein the first wheel truck is a pivoting wheel truck that is pivotable relative to the lift member; and
    wherein the lift member is rigidly coupled with the second side frame, wherein the second wheel truck is a static wheel truck that is static relative to the lift member.

2. The system of claim 1, further comprising a vessel cradle, the vessel cradle couplable with a portion of the lift member.

3. The system of claim 1, wherein the pivoting wheel truck is pivotable relative to the lift member in response to load on the lift member.

4. The system of claim 1, wherein the pivoting wheel truck is pivotable relative to the lift member in response to load on the lift member, and wherein the static wheel truck is static relative to the lift member in response to load on the lift member.

5. A vessel transfer system, the system comprising:
    multiple bogies, each bogie including a first side frame, a second side frame, at least one wheel coupled with each of the first and second side frames, and a lift member comprising a hydraulic lift cylinder, the lift member coupled with each of the first and second side frames, wherein the lift member is pivotably coupled to the first side frame;
    wherein each bogie comprises a hydraulic drive coupled with at least one wheel of the bogie and a hydraulic power unit;
    wherein the multiple bogies are linked together in at least one bogie train, wherein the hydraulic power unit is hydraulically coupled with the hydraulic lift cylinder and the hydraulic drive of each of the multiple bogies; and
    a lateral transfer drive assembly comprising a frame on wheels, wherein the hydraulic power unit is positioned on the frame of the lateral transfer drive assembly, and wherein the lateral transfer drive assembly is towed by at least one bogie in the at least one bogie train.

6. The system of claim 5, wherein the multiple bogies are arranged within multiple, hydraulically isolated zones, wherein each bogie within a particular zone is hydraulically interconnected with all other bogies within that particular zone.

7. The system of claim 6, wherein the hydraulic lift cylinders within a particular zone are hydrostatically connected with all other hydraulic lift cylinders within that particular zone, such that all hydraulic lift cylinders within that particular zone are simultaneously and synchronously operable.

8. The system of claim 7, where each zone of hydraulic lift cylinders is independently operable from other zones of hydraulic lift cylinders.

9. A vessel transfer system, the system comprising:
- a bogie, the bogie including a first side frame, a second side frame, at least one wheel coupled with each of the first and second side frames, and a lift member coupled with each of the first and second side frames, wherein the lift member is pivotably coupled to the first side frame;
- a shipyard, the shipyard including rail tracks, wherein the wheels of the bogie are engaged on the rail racks;
- a gear rack coupled to a surface of the shipyard; and
- a rack and pinion bogie, the rack and pinion bogie including a frame and pinion gears coupled with the frame, wherein the pinion gears are coupled with the gear rack.

10. A method of moving a cradled vessel within a shipyard, wherein the cradled vessel includes a vessel supported on a cradle, the method comprising:
- positioning at least two bogie trains relative to the cradled vessel, wherein each bogie train includes at least two bogies, wherein each bogie includes a first side frame, a second side frame, at least one wheel coupled with each of the first and second side frames, and a lift member coupled with each of the first and second side frames, and wherein the lift member is pivotably coupled to the first side frame;
- actuating the lift members to engage the cradle and lift the cradled vessel above a surface of the shipyard;
- actuating the wheels to move the bogie trains within the shipyard, thereby moving the cradled vessel within the shipyard;
- actuating the lift members to lower the cradled vessel into engagement with the shipyard and to disengage the lift members from the cradle;
- wherein the lift member of each bogie is rigidly coupled with the second side frame thereof, wherein the second side frame with the at least one wheel coupled therewith is a static wheel truck that remains static relative to a position of the lift member during actuation of the lift members and movement of the bogie trains within the shipyard; and
- wherein the first side frame with the at least one wheel coupled therewith of each bogie is a pivoting wheel truck that is pivotable relative to the lift member thereof during actuation of the lift members and movement of the bogie trains within the shipyard.

11. The method of claim 10, wherein each bogie includes a hydraulic drive coupled with at least one wheel of the bogie, wherein the lift members are hydraulic lift cylinders, and wherein actuating the wheels of the bogies includes actuating the hydraulic drives, and wherein actuating the lift members and the hydraulic drives includes providing hydraulic fluid to the hydraulic lift cylinders and the hydraulic drives from a hydraulic power unit.

12. The method of claim 11, further comprising arranging the bogies within multiple, hydraulically isolated zones, wherein each bogie within a particular zone is hydraulically interconnected with all other bogies within that particular zone.

13. The method of claim 12, wherein each zone of hydraulic lift cylinders is independently operable from other zones of hydraulic lift cylinders.

14. The method of claim 13, further comprising actuating the hydraulic lift cylinders within each zone, independently from actuation of the hydraulic lift cylinders within other zones, thereby lifting the cradled vessel via a multi-point lift, wherein each point of the multi-point lift is defined by at least one zone.

15. A method of moving a cradled vessel within a shipyard, wherein the cradled vessel includes a vessel supported on a cradle, the method comprising:
- positioning at least two bogie trains relative to the cradled vessel, wherein each bogie train includes at least two bogies, wherein each bogie includes a first side frame, a second side frame, at least one wheel coupled with each of the first and second side frames, and a lift member coupled with each of the first and second side frames, and wherein the lift member is pivotably coupled to the first side frame;
- actuating the lift members to engage the cradle and lift the cradled vessel above a surface of the shipyard;
- actuating the wheels to move the bogie trains within the shipyard, thereby moving the cradled vessel within the shipyard;
- actuating the lift members to lower the cradled vessel into engagement with the shipyard and to disengage the lift members from the cradle;
- wherein the lift members include flanges, and wherein engaging the cradle with the lift members includes capturing the flanges within cradle mountings on a frame of the cradle.

16. A method of moving a cradled vessel within a shipyard, wherein the cradled vessel includes a vessel supported on a cradle, the method comprising:
- positioning at least two bogie trains relative to the cradled vessel, wherein each bogie train includes at least two bogies, wherein each bogie includes a first side frame, a second side frame, at least one wheel coupled with each of the first and second side frames, and a lift member coupled with each of the first and second side frames, and wherein the lift member is pivotably coupled to the first side frame;
- actuating the lift members to engage the cradle and lift the cradled vessel above a surface of the shipyard;
- actuating the wheels to move the bogie trains within the shipyard, thereby moving the cradled vessel within the shipyard;
- actuating the lift members to lower the cradled vessel into engagement with the shipyard and to disengage the lift members from the cradle;
- wherein each bogie train moves along rail tracks on the shipyard;
- wherein, when a first bogie train of the at least two bogie trains is engaged with a first rail track of the rail tracks and a second bogie train of the at least two bogie trains is engaged with a second rail track of the rail tracks, and wherein the first and second rail tracks are not at the same elevation, the method includes:
  - actuating the lift members of at least one of the first and second bogie trains to raise or lower the lift members, thereby maintaining the cradled vessel level and equally distributing load amongst all wheels of the bogies.

17. A bogie, the bogie comprising:
- a pivoting wheel truck having a first wheel coupled with a first frame;
- a static wheel truck having a second wheel coupled with a second frame; and
- a lift cylinder coupled with the pivoting wheel truck and the static wheel truck, wherein the pivoting wheel truck is pivotable relative to the lift member.

18. The bogie of claim 17, wherein the pivoting wheel truck is pivotable relative to the lift member in response to load on the lift member.

19. A method of moving a cradled vessel within a shipyard, wherein the cradled vessel includes a vessel supported on a cradle, the method comprising:
    positioning a bogie relative to the cradled vessel, wherein the bogie comprises a pivoting wheel truck having a first wheel coupled with a first frame, a static wheel truck having a second wheel coupled with a second frame, and a lift cylinder coupled with the pivoting wheel truck and the static wheel truck, wherein the pivoting wheel truck is pivotable relative to the lift member;
    actuating the lift member to engage the cradle and lift the cradled vessel; and
    actuating the first and second wheels to move the bogie within the shipyard, thereby moving the cradled vessel within the shipyard.

20. The method of claim 19, wherein the pivoting wheel truck pivots relative to the lift member in response to load on the lift member.

21. The method of claim 19, wherein the pivoting wheel truck pivots relative to the lift member during actuation of the lift member and during movement of the bogie within the shipyard.

* * * * *